US012779895B2

(12) United States Patent
Pittet et al.

(10) Patent No.: US 12,779,895 B2
(45) Date of Patent: Nov. 3, 2026

(54) METHODS FOR PRODUCING SECURITY FEATURES EXHIBITING ONE OR MORE INDICIA

(71) Applicant: SICPA HOLDING SA, Prilly (CH)

(72) Inventors: Hervé Pittet, Châtel-St-Denis (CH); Patrick Veya, Aclens (CH); Thibaut Martini, Nyon (CH); Riccardo Ruggerone, Echallens (CH)

(73) Assignee: SICPA HOLDING SA, Prilly (CH)

( * ) Notice: Subject to any disclaimer, the term of this patent is extended or adjusted under 35 U.S.C. 154(b) by 465 days.

(21) Appl. No.: 18/685,142

(22) PCT Filed: Aug. 18, 2022

(86) PCT No.: PCT/EP2022/073048
§ 371 (c)(1),
(2) Date: Feb. 20, 2024

(87) PCT Pub. No.: WO2023/021128
PCT Pub. Date: Feb. 23, 2023

(65) Prior Publication Data

US 2024/0351361 A1 Oct. 24, 2024

(30) Foreign Application Priority Data

Aug. 19, 2021 (EP) .................................... 21192247

(51) Int. Cl.
*B42D 25/387* (2014.01)
*B42D 25/29* (2014.01)
(Continued)

(52) U.S. Cl.
CPC ........... *B42D 25/387* (2014.10); *B42D 25/29* (2014.10); *B42D 25/373* (2014.10); *C09D 11/101* (2013.01); *C09D 11/322* (2013.01)

(58) Field of Classification Search
CPC .... B42D 25/387; B42D 25/29; B42D 25/373; C09D 11/101; C09D 11/322
See application file for complete search history.

(56) References Cited

U.S. PATENT DOCUMENTS 4,705,300 A 11/1987 Berning et al.
4,705,356 A 11/1987 Berning et al.
(Continued)

FOREIGN PATENT DOCUMENTS

DE 102013008926 11/2014
EP 1090963 4/2001
(Continued)

OTHER PUBLICATIONS

*Handbook of Print Media*, Helmut Kipphan, Springer Edition, 2001, p. 48.
(Continued)

*Primary Examiner* — Robert S Jones, Jr.
*Assistant Examiner* — Elizabeth Amato
(74) *Attorney, Agent, or Firm* — MUNCY, GEISSLER, OLDS & LOWE, P.C.

(57) ABSTRACT

The present invention relates to the field of methods for producing eye-catching overt security features exhibiting one or more indicia as anti-counterfeit means on security documents or security articles as well as decorative purposes. In particular, the present invention provides methods for producing security features that can be easily, directly and unambiguously authenticated by the human without any external device or tool, wherein said security features comprised a cured UV-Vis radiation cationically or hybrid curable coating composition and cured one or more indicia, said composition comprising an ink vehicle and pigments comprising a flake-shaped non-metallic or metallic substrate comprising one or more at least partial coating layers, an at (Continued)

least partial surface treatment layer made of one or more surface modifiers based on perfluoropolyethers.

20 Claims, 2 Drawing Sheets

(51) Int. Cl.

| | |
|---|---|
| ***B42D 25/373*** | (2014.01) |
| ***C09D 11/101*** | (2014.01) |
| ***C09D 11/322*** | (2014.01) |

(56) References Cited

U.S. PATENT DOCUMENTS

| | | | | |
|---|---|---|---|---|
| 4,721,271 | A | 1/1988 | Goldstein et al. | |
| 5,084,351 | A | 1/1992 | Philips et al. | |
| 5,214,530 | A | 5/1993 | Coombs et al. | |
| 5,281,480 | A | 1/1994 | Phillips et al. | |
| 5,383,995 | A | 1/1995 | Phillips et al. | |
| 5,418,301 | A | 5/1995 | Hult et al. | |
| 5,569,535 | A | 10/1996 | Phillips et al. | |
| 5,571,624 | A | 11/1996 | Phillips et al. | |
| 9,914,846 | B2 | 3/2018 | Reiter et al. | |
| 2002/0096087 | A1 | 7/2002 | Glausch | |
| 2004/0069187 | A1 | 4/2004 | Umehara et al. | |
| 2015/0166799 | A1 | 6/2015 | Schoenefeld et al. | |
| 2015/0344722 | A1* | 12/2015 | Lin ...................... | C09D 133/14 428/483 |
| 2016/0130461 | A1 | 5/2016 | Reiter et al. | |
| 2016/0207344 | A1 | 7/2016 | Klein et al. | |

FOREIGN PATENT DOCUMENTS

| | | |
|---|---|---|
| EP | 1719636 | 11/2006 |
| JP | 2000273399 | 10/2000 |
| JP | 2003261817 | 9/2003 |
| JP | 2004244562 | 9/2004 |
| WO | 2003020834 | 3/2003 |
| WO | 2006117271 | 11/2006 |
| WO | 2007060133 | 5/2007 |
| WO | 2008148201 | 12/2008 |
| WO | 2010058026 | 5/2010 |
| WO | 2010115986 | 10/2010 |
| WO | 2013119387 | 8/2013 |
| WO | 2016005158 | 1/2016 |
| WO | 2017129666 | 8/2017 |
| WO | 2019002046 | 1/2019 |
| WO | 2019219250 | 11/2019 |
| WO | 2020169316 | 8/2020 |
| WO | 2021175907 | 9/2021 |

OTHER PUBLICATIONS

*Printing Technology*, J. M. Adams and P. A. Dolin, Delmar Thomson Learning, 5th Edition, 2002, pp. 359-360.

*The Printing Ink Manual*, R.H. Leach and R.J. Pierce, Springer Edition, 5th Edition, 2008, pp. 58-62.

*Printing Technology*, J. M. Adams and P.A. Dolin, Delmar Thomson Learning, 5th Edition, 2002, pp. 293-328.

*Handbook of Print Media*, H. Kipphan, Springer, 2001, pp. 409-422.

*Handbook of Print Media*, H. Kipphan, Springer, 2001, pp. 498-499.

"Chemistry & Technology of UV & EB Formulation for Coatings, Inks & Paints", vol. III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

Industrial Photoinitiators, W. A. Green, CRC Press, 2010, Table 8.1, p. 170.

F. C. Krebs, Solar Energy Materials & Solar Cells (2009), 93, p. 407.

F. C. Krebs, Solar Energy Materials & Solar Cells (2009), 93, p. 405-406.

N. J. Wilkinson et al., "A review of aerosol jet print—a non-traditional hybrid process for micro-manufacturing," The International Journal of Advanced Manufacturing Technology (2019), pp. 4599-4619.

P.V. Raje and N.C. Murmu, "A review on Electrohydrodynamic-inkjet printing. Technology," International Journal of Emerging Technology and Advanced Engineering, (2014), 4(5), pp. 174-183.

International Search Report and Written Opinion issued with respect to application No. PCT/EP2022/073048.

* cited by examiner

METHODS FOR PRODUCING SECURITY FEATURES EXHIBITING ONE OR MORE INDICIA

FIELD OF THE INVENTION

The present invention relates to the field of methods for producing security features on substrates, in particular on security documents or article. In particular, the present invention provides methods for producing eye-catching overt security features exhibiting one or more indicia as anti-counterfeit means on security documents or security articles as well as decorative purposes.

BACKGROUND OF THE INVENTION

Security features, e.g. for security documents, can generally be classified into "covert" security features on the one hand, and "overt" security features on the other hand. The protection provided by covert security features relies on the concept that such features are difficult to detect, typically requiring specialized equipment and knowledge for detection, whereas "overt" security features rely on the concept of being easily detectable with the unaided human senses, e.g. such features may be visible and/or detectable via the tactile senses while still being difficult to produce and/or to copy. However, the effectiveness of overt security features depends to a great extent on their easy recognition as a security feature, because most users, and particularly those having no prior knowledge of the security features of a document or item secured therewith, will only then actually perform a security check based on said security feature if they have actual knowledge of their existence and nature.

Examples of overt security features include reflective features and optically variable features, wherein said security features exhibit a color shift or color change, expressed by a change of the lightness and/or chroma and/or hue, upon variation of the angle of observation. Typically, said security features are made from inks comprising flake-shaped multilayer interference pigments.

WO 2019/002046 A1 discloses a method for printing security features, said method comprising a step of inkjet printing using a flextensional ink jet print head structure. The method allows the production of overt security features optionally with one or more indicia. However, flextensional printing techniques are known to be cumbersome and unsuitable to print security features at high speed in an industrial environment.

WO 2003/020834 A1 discloses water-based security inks comprising flake-shaped multilayer interference pigments for producing optically variable security features. With the aim of avoiding or reducing corrosion of the pigments in the water-based inks, the surface of said pigments is treated by a passivating agent such as for example fluorinated organic esters of phosphoric acid. However, water-based security inks may be difficult to print and result in a long drying process.

WO 2006/117271 A1 discloses solvent-based security inks comprising flake-shaped multilayer interference pigments for producing optically variable security features. However, the increasing sensitivity of the public to environmental concerns, as well as the necessary responsiveness of the chemical industry to environmental regulations such as REACH and GHS, have resulted in the formulation of inks containing a significantly reduced amount of organic solvent (volatile organic components, VOC) and have motivated the industry to develop UV-Vis radiation curable screen printing inks comprising said flake-shaped pigments.

It is known in the art that the perceived optical characteristics of reflective features and optically variable features comprising flake-shaped pigments depend on said flake-shaped pigments orientation in the dried ink on a substrate. Whereas the gradual drying process of water-based or solvent-based inks comprising flake-shaped pigments advantageously allows a reduction of the thickness of said applied inks and allows the flake-shaped pigments to orient themselves substantially parallel to the substrate onto which said inks are applied and thus produce reflective features and optically variable exhibiting good optical characteristics, the instantaneous hardening process of UV-Vis radiation curable inks comprising flake-shaped pigment and the substantially unchanged thickness of the cured ink layer may lead to a random orientation of said pigments and thus produce reflective features and optically variable that may exhibit poor optical characteristics.

With the aim of improving the striking effect and the optical properties of reflective features and optically variable security features based on flake-shaped pigments, said pigments have been surface treated with hydrophobic compounds so that they arrange more readily in a plane substantially parallel to the substrate onto which inks comprising said pigments are applied. Surface treated pigments are referred in the literature as leafing pigments.

EP 1 090 963 A1 discloses flaky iridescent pigments being surface treated with fluorine-containing phosphates as well as inks, paints, plastics or cosmetics comprising said pigments. EP 1 090 963 A1 discloses a solvent-based gravure printing ink.

US 2002/0096087 discloses platelet-shaped pearl luster pigments on the basis of a platelet-shaped pigment containing at least one organic hydrophobic coupling agent such as for example fluorine-containing silanes and their use in paints, inks, plastics, coatings and cosmetics.

US 2004/0069187 discloses flaky pigments coated with a coupling agent and an organic compound having a perfluoroalkyl group and their use in printing inks.

US 2015/0166799 disclosed flake-form effect pigments coated with an organic coating which contains fluoroalkyl groups and hydrophilic groups built up from at least one siloxane and/or at least one silane and their use in many applications and their use in paints, inks, plastics, coatings and cosmetics.

US 2016/0207344 discloses a printed image which consists of at least two area units on a substrate, where a first area unit comprises first flake-form effect pigments comprising an outer layer comprising a non-metallic, inorganic material, and a second area unit comprises a second flake-form effect pigments, comprising an outer layer comprising an organic surface modifier such as organofunctional siloxanes contain fluoroalkyl groups and aminoalkyl groups. US 2016/0207344 discloses printing inks which may be solvent-based inks or UV curable inks.

US 2016/130461 A1 discloses UV-Vis radiation curable compositions comprising effect pigments being coated with at least one metal oxide layer to which at least one organic compound having one or more functional groups with a carbon-carbon multiple bond is bound.

WO 2013/119387 A1 discloses UV radiation radically curable metallic decorative composition comprising leafing metallic pigment flakes, an acrylate oligomer and/or an acrylate monomer, an initiator or mixture of initiators, and a cure accelerator that is a tertiary amine. The disclosed leafing metallic pigment flakes are surface treated with fatty acids, phosphorous compounds, silane or aliphatic amines. The disclosed UV-Vis radiation curable ink suffers from poor optical properties including a poor visual appearance and from a low chroma.

WO 2020/169316 A1 discloses UV-Vis radiation radically curable security inks comprising pigments comprising a flake-shaped non-metallic or metallic substrate comprising one or more at least partial coating layers, an at least partial surface treatment layer made of one or more surface modifiers selected from fluoro compounds.

JP 2004244562 discloses UV radiation cationically curable inks comprising leafing aluminum pigments surface treated with stearic acid, a cationic photoinitiator and a hydroxyl fatty acid to improve defoaming properties of said inks. However, the use of a cationic photoinitiator in compositions comprising aluminum pigments surface treated with stearic acid results in the substitution of the stearic acid by the acid generated by the cationic photoinitiator and thus results in the loss of leafing effect and loss of the optical properties obtained therefrom.

JP 2000273399 discloses a UV cationically or radically curable film-forming composition containing aluminum powder being treated with an alkyl surfactant (stearic acid). Such treatment does not allow to orient the aluminum flakes parallel to the substrate surface at industrial printing speed, thus leading to cured coatings with inferior poor optical characteristics.

JP 2003261817 discloses a UV cationically curable composition containing an aluminum pigment and an amine. The disclosed compositions do not allow a sufficiently fast development of the metallic shine in a high-speed, industrial printing process thus leading to cured coatings with poor optical properties.

U.S. Pat. No. 9,914,846 discloses radiation-curing coating compositions comprising a modified effect pigment, wherein said effect pigment is coated with at least one layer of a metal oxide and comprises silicon dioxide, aluminum oxide, titanium dioxide, iron oxide, tin oxide, zinc oxide or mixtures thereof, and at least one organic compound having one or more functional groups with a carbon-carbon multiple bond. It is further disclosed that the organic compound is bound to the layer of a metal oxide and that the suitable modified effect pigment has no organic oligomers or polymers. U.S. Pat. No. 9,914,846 discloses coating compositions comprising conventional UV curable compounds wherein both radically polymerizable and cationically polymerizable binders can be used. The exemplified compositions are acrylate-based radically curable UV printing inks comprising aluminum pigments coated with $SiO_2$ and comprising a methacrylate-functional silane compound. Since the surface tension of the coating matrix is not optimized, a sufficiently fast orientation of the effect pigments at industrial printing speed cannot be obtained, thus leading to comparatively poor optical characteristics.

Therefore, a need remains for methods for producing eye-catching customized overt security features, in particular for highly demanding applications requiring high counterfeiting resilience and excellent optical properties, wherein said methods should be reliable, easy to implement and able to work at a high production speed. In particular, there is a need for methods using solvent-free or low VOC containing UV-Vis radiation curable security inks being cationically curable inks or hybrid curable inks for producing customized overt security features based on flake-shaped multilayer interference pigments and exhibiting one or more indicia, wherein said security features exhibit easily recognizable optical characteristics, in particular exhibit a contrast of chroma, lightness and/or colorshifting properties thus allowing an easy, direct and unambiguous authentication by the human without any external device or tool.

SUMMARY OF THE INVENTION

Accordingly, it is an object of the present invention to overcome the deficiencies of the prior art. This is achieved by the provision of a method for producing a security feature, said security feature exhibiting one or more indicia on a substrate, the method comprising the steps of:

a step a) of applying on a substrate (x20) surface a UV-Vis radiation curable coating composition, said UV-Vis radiation curable coating composition being in a first, liquid state so as to form a coating layer (x10), said UV-Vis radiation curable coating composition comprising:

i) from about 75 wt-% to about 99 wt-% of an ink vehicle having a viscosity between about 100 and about 2000 mPas at 25° C. and comprising:

a) a1) from 45 wt-% to about 75 wt-% of one or more cycloaliphatic epoxides and a2) from about 2 wt-% to about 15 wt-% of one or more cationic photoinitiators being onium salts, preferably being selected from the group consisting of oxonium salts, iodonium salts, sulfonium salts and mixtures thereof, or b) b1) from 45 wt-% to about 75 wt-% of a mixture comprising one or more cycloaliphatic epoxides and one or more radically curable compounds selected from the group consisting of tri(meth) acrylates, tetra(meth)acrylates and mixtures thereof and b2) from about 2 wt-% to about 15 wt-% of a mixture of one or more cationic photoinitiators being onium salts, preferably being selected from the group consisting of oxonium salts, iodonium salts, sulfonium salts and mixtures thereof and one or more free radical photoinitiators, preferably selected from the group consisting of alpha-hydroxyketones, benzyl ketals, benzoin ethers, phosphine oxides, phenylglyoxylates and mixtures thereof, more preferably selected from the group consisting of alpha-hydroxyketones, c) the ink vehicle optionally comprising one or more vinyl ethers in an amount less than about 20 wt-%, or one or more oxetanes in an amount less than or equal to about 30 wt-% or a combination of one or more vinyl ethers and one or more oxetanes in an amount less than or equal to about 15 wt-%, the weight percents of a), b) and c) being based on the total weight of the ink vehicle; and ii) from about 1 to about 25 wt-% of pigments comprising a flake-shaped non-metallic or metallic substrate, wherein said non-metallic or metallic substrate comprises one or more at least partial coating layers independently made of one or more metal oxides, one or more metal oxide hydrates, one or more metal suboxides or mixtures of these materials and comprises an at least partial surface treatment layer facing the environment, being in direct contact with the top layer of the one or more at least partial coating layers and made of one or more surface modifiers selected from perfluoropolyethers, said perfluoropolyethers being functionalized with one or more phosphor (P) containing groups or one or more silicon (Si) containing groups, the weight percent of i) and ii) being based on the total weight of the UV-Vis radiation curable coating composition, subsequently to the step a), a step b) of applying by a contactless fluid microdispensing technology a top coating composition at least partially on top of the coating layer (x10), wherein said top coating composition is applied in the form of one or more indicia (x30), wherein said one or more indicia (x30) have an ink deposit of at least 5 g/$m^2$;

subsequently to step b), a step c) of curing the coating layer (x10) and the one or more indicia (x30) with one or more curing units (x50), wherein the time between steps b) and c) is less than 30 seconds.

According to one embodiment, the UV-Vis radiation curable coating composition described herein is a UV-Vis radiation cationically curable coating composition and comprises a cationically curable ink vehicle, preferably comprising from about 45 wt-% to about 75 wt-% of one or more cycloaliphatic epoxides (preferably cycloaliphatic epoxides comprising more than one cyclohexane epoxide groups), one or more vinyl ethers, one or more oxetanes, one or more polyhydroxy compounds and from about 2 wt-% to about 15 wt-% of the one or more cationic photoinitiators being onium salts (preferably one or more salts being selected from the group consisting of oxonium salts, iodonium salts, sulfonium salts and mixtures thereof and preferably iodonium salts) optionally one or more photosensitizers (preferably thioxanthone derivatives) and optionally one or more fillers and the top coating composition described herein comprises one or more cationically curable compounds, one or more hybrid curable compounds, one or more solvents, a blend of one or more radically curable compounds and one or more radical photoinitiators or a mixture thereof.

According to another embodiment, the UV-Vis radiation curable coating composition described herein is a UV-Vis radiation hybrid curable coating composition and comprises a hybrid curable ink vehicle, preferably comprising from about 45 to about 75 wt-% of a mixture comprising one or more cycloaliphatic epoxides and one or more radically curable compounds selected from the group consisting of tri(meth)acrylates, tetra(meth)acrylates and mixtures thereof and from about 2 wt-% to about 15 wt-% of the mixture of one or more cationic photoinitiators being onium salts (preferably one or more salts being selected from the group consisting of oxonium salts, iodonium salts, sulfonium salts and mixtures thereof) and one or more free radical photoinitiators (preferably selected from the group consisting of alpha-hydroxyketones, benzyl ketals, benzoin ethers, phosphine oxides, phenylglyoxylates and mixtures thereof, more preferably selected from the group consisting of alpha-hydroxyketones), wherein said one or more radically curable compounds are present in an amount less than or equal to 35 wt-%, preferably less than or equal to 30 wt-%, the weight percents being based on the total weight of the ink vehicle and the top coating composition comprises one or more cationically curable compounds, one or more hybrid curable compounds, one or more solvents, one or more radically curable compounds or a mixture thereof.

In one preferred embodiment, the step a) of applying the UV-Vis radiation curable coating composition described herein is carried out by a printing process selected from the group consisting of rotogravure processes, flexography processes and screen printing processes, preferably selected from the group consisting of screen printing processes.

In one preferred embodiment, the step b) of applying the top coating composition is carried out by an inkjet printing process, preferably by a drop-on-demand inkjet printing process.

Also described herein are security features produced by the method described herein and security documents as well as decorative elements and objects comprising the one or more security features described herein.

Also described herein are methods of manufacturing a security document or a decorative element or object, comprising a) providing a security document or a decorative element or object, and b) providing one or more security features such as those described herein, in particular such as those obtained by the method described herein, so that it is comprised on or by the security document or decorative element or object.

The method described herein advantageously uses two compositions, wherein said two compositions are applied on each other in a wet-on-wet state, i.e. the top coating composition described herein is applied at least partially on the applied UV-Vis radiation curable coating composition described herein while said composition is still in an at least partially unpolymerized state. In particular, the method according to the invention allows the production of eye-catching overt security features exhibiting one or more indicia in a versatile manner, can be easily implemented on an industrial scale at a high production speed. The two compositions used in the method described herein comprise as a first composition, the UV-Vis radiation curable coating composition comprising the pigments comprising the flake-shaped non-metallic or metallic substrate described herein which is applied on the substrate (x20) described herein and the top coating composition described herein as second composition which is applied at least partially on top of the UV-Vis radiation curable coating composition and at least partially overlaps (i.e. overlaps in at least one area) said composition and which is applied in the form of the one or more indicia described herein, when said UV-Vis radiation curable coating composition is still in a wet, at least partially unpolymerized state. Upon curing of the UV-Vis radiation curable coating composition and the top coating composition in the shape of the one or more indicia (x30), the so-obtained overt security features comprise a first area made of the cured coated layer (x10) lacking the cured inkjet printed indicium (x30) and a second area made of the combination of the cured coated layer (x10) and the cured inkjet printed indicium (x30), said first and second areas exhibiting different optical characteristics in terms of chroma, lightness and/or colorshifting properties thus allowing an easy, direct and unambiguous authentication by the human without any external device or tool of the overt security feature.

Figure 2:
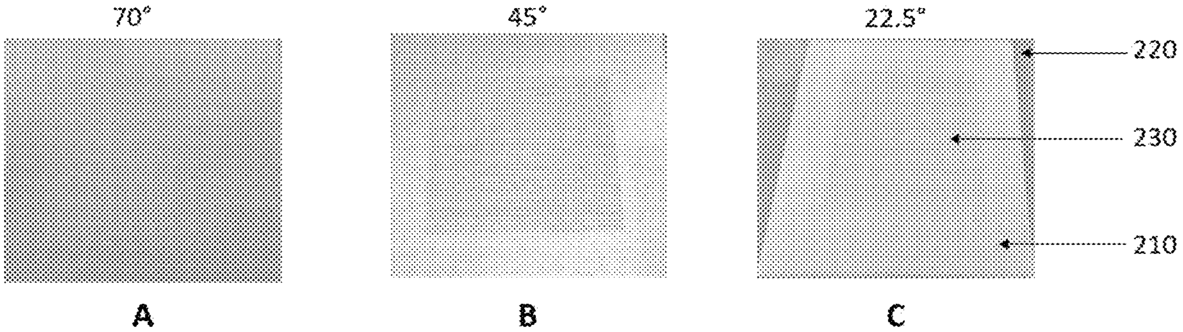
FIG. 2-4 show pictures of a substrate (x20: 220, 320, 420) comprising a security feature exhibiting an indicium (square shape) consisting of a cured inkjet printed indicium (x30: 230, 330, 430), said security feature being prepared with the method according to the present invention, comprising a first area made of a cured coated layer (x10: 210, 310, 410) lacking the cured inkjet printed indicium (x30) and a second area made of the combination of the cured coated layer (x10.
Figure 3:
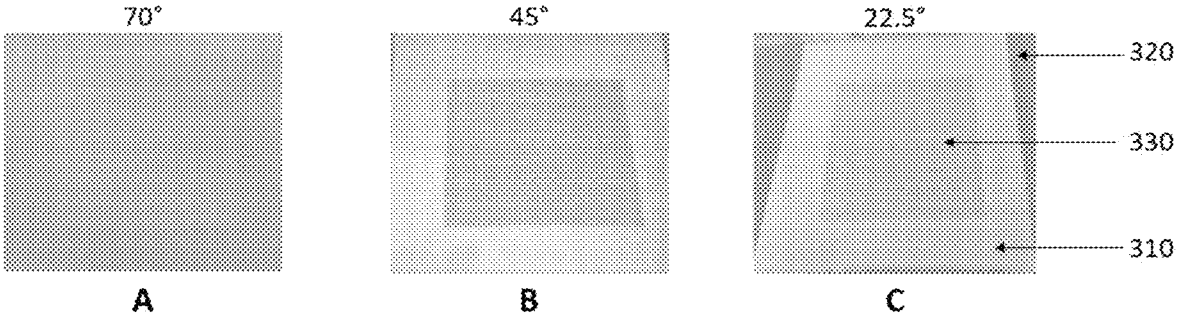
Figure 4:
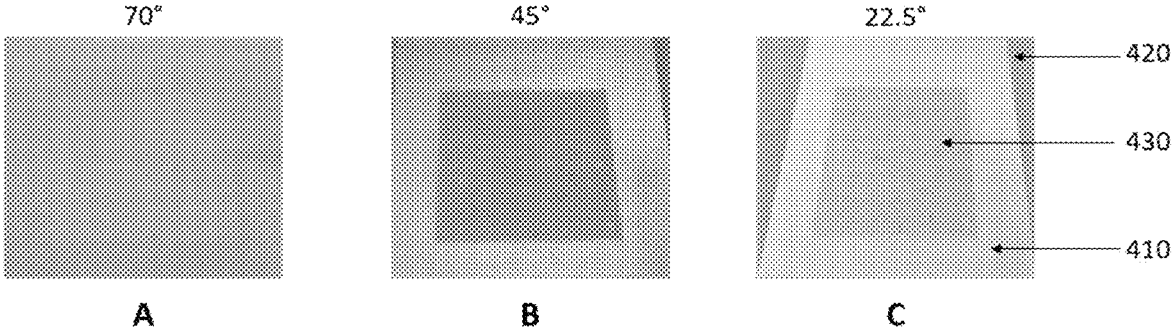

210, 310, 410) and the cured inkjet printed indicium (x30: 230, 330, 430) and being observed under diffuse illumination at angles 70° (FIGS. 2A, 3A and 4A), 45° (FIGS. 2B, 3B and 4B) and 22.5° (FIGS. 2C, 3C and 4C).

Figure 5:
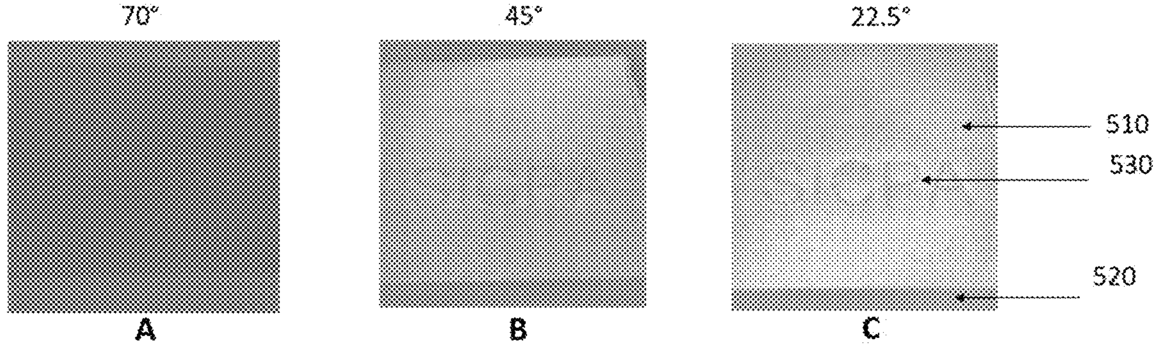

FIG. 5 show pictures of a substrate (520) comprising a security feature exhibiting an indicium (530) in the shape of the name "SICPA", said security feature being prepared with the method according to the present invention, comprising a first area made of a cured coated layer (510) lacking the cured inkjet printed indicium (530) and a second area made of the combination of the cured coated layer (510) and the cured inkjet printed indicium (530) and being observed under diffuse illumination at angles 70° (FIG. 5A), 45° (FIG. 5B) and 22.5° (FIG. 5C).

DETAILED DESCRIPTION

Definitions

The following definitions are to be used to interpret the meaning of the terms discussed in the description and recited in the claims.

As used herein, the article "a" indicates one as well as more than one and does not necessarily limit its referent noun to the singular.

As used herein, the term "at least one" is meant to define one or more than one, for example one or two or three.

As used herein, the term "about" means that the amount or value in question may be the specific value designated or some other value in its neighborhood. Generally, the term "about" denoting a certain value is intended to denote a range within ±5% of the value. As one example, the phrase "about 100" denotes a range of 100±5, i.e. the range from 95 to 105. Preferably, the range denoted by the term "about" denotes a range within ±3% of the value, more preferably ±1%. Generally, when the term "about" is used, it can be expected that similar results or effects according to the invention can be obtained within a range of ±5% of the indicated value.

As used herein, the term "and/or" means that either all or only one of the elements of said group may be present. For example, "A and/or B" means "only A, or only B, or both A and B". In the case of "only A", the term also covers the possibility that B is absent, i.e. "only A, but not B".

The term "comprising" as used herein is intended to be non-exclusive and open-ended. Thus, for instance a solution comprising a compound A may include other compounds besides A. However, the term "comprising" also covers, as a particular embodiment thereof, the more restrictive meanings of "consisting essentially of" and "consisting of", so that for instance "a solution comprising A, B and optionally C" may also (essentially) consist of A and B, or (essentially) consist of A, B and C.

The term "UV-Vis curable" and "UV-Vis curing" refers to radiation-curing by photo-polymerization, under the influence of an irradiation having wavelength components in the UV or in the UV and visible part of the electromagnetic spectrum (typically 100 nm to 800 nm, preferably between 150 and 600 nm and more preferably between 200 and 400 nm).

The term "coating composition" refers to any composition which is capable of forming a layer on a solid substrate and which can be applied preferably but not exclusively by a printing method. The UV-Vis radiation curable coating composition comprises the pigments comprising the flake-shaped non-metallic or metallic substrate described herein. The term "top coating composition" refers to a composition which does not comprise the pigments comprising the flake-shaped non-metallic or metallic substrate described herein.

The term "(meth)acrylate" in the context of the present invention refers to the acrylate as well as the corresponding methacrylate. Likewise, "di(meth)acrylate" refers to diacrylate as well as the corresponding dimethacrylate and tri (meth)acrylate" refers to triacrylate as well as the corresponding trimethacrylate The term "security document" refers to a document which is usually protected against counterfeit or fraud by at least one security feature. Examples of security documents include without limitation value documents and value commercial goods.

The term "security feature" is used to denote an image, pattern or graphic element that can be used for authentication purposes.

Where the present description refers to "preferred" embodiments/features, combinations of these "preferred" embodiments/features are also deemed to be disclosed as long as the specific combination of "preferred" embodiments/features is technically meaningful.

The method described herein comprises the step a) of applying on the substrate (x20) surface described herein the UV-Vis radiation curable coating composition comprising the pigments comprising the flake-shaped non-metallic or metallic substrate described herein so as to form the coating layer (x10) described herein, said composition being in a first liquid state which allows its application as a layer and which is in a not yet cured (i.e. wet) state. Since the UV-Vis radiation curable coating composition described herein is to be provided on the substrate (x20) surface, the UV-Vis radiation curable coating composition comprises at least the ink vehicle described herein and the pigments comprising the flake-shaped non-metallic or metallic substrate described herein, wherein said composition is in a form that allows its processing on the desired printing or coating equipment. Preferably, said step a) is carried out by a printing process, preferably selected from the group consisting of screen printing processes, rotogravure printing processes and flexography printing processes and still more preferably screen printing processes. Accordingly, the UV-Vis radiation curable coating composition is preferably selected from the group consisting of screen printing inks, a rotogravure printing inks and flexography printings and more preferably screen printing inks.

As known by those skilled in the art, the term rotogravure refers to a printing process which is described for example in *Handbook of Print Media*, Helmut Kipphan, Springer Edition, page 48. Rotogravure is a printing process wherein image elements are engraved into the surface of the cylinder. The non-image areas are at a constant original level. Prior to printing, the entire printing plate (non-printing and printing elements) is inked and flooded with ink. Ink is removed from the non-image by a wiper or a blade before printing, so that ink remains only in the cells. The image is transferred from the cells to the substrate by a pressure typically in the range of 2 to 4 bars and by the adhesive forces between the substrate and the ink. The term rotogravure does not encompass intaglio printing processes (also referred in the art as engraved steel die or copper plate printing processes) which rely for example on a different type of ink.

Flexography printing methods preferably use a unit with a chambered doctor blade, an anilox roller and plate cylinder. The anilox roller advantageously has small cells whose volume and/or density determines the ink or varnish application rate. The chambered doctor blade lies against the anilox roller, filling the cells and scraping off surplus ink or varnish at the same time. The anilox roller transfers the ink to the plate cylinder which finally transfers the ink to the substrate. Plate cylinders can be made from polymeric or elastomeric materials. Polymers are mainly used as photopolymer in plates and sometimes as a seamless coating on a sleeve. Photopolymer plates are made from light-sensitive polymers that are hardened by ultraviolet (UV) light. Photopolymer plates are cut to the required size and placed in an UV light exposure unit. One side of the plate is completely exposed to UV light to harden or cure the base of the plate. The plate is then turned over, a negative of the job is mounted over the uncured side and the plate is further exposed to UV light. This hardens the plate in the image areas. The plate is then processed to remove the unhardened photopolymer from the non-image areas, which lowers the plate surface in these non-image areas. After processing, the plate is dried and given a post-exposure dose of UV light to cure the whole plate. Preparation of plate cylinders for flexography is described in *Printing Technology*, J. M. Adams and P. A. Dolin, Delmar Thomson Learning, $5^{th}$ Edition, pages 359-360.

Screen printing (also referred in the art as silkscreen printing) is a printing technique that typically uses a screen made of woven mesh to support an ink-blocking stencil. The attached stencil forms open areas of mesh that transfer ink as a sharp-edged image onto a substrate. A squeegee is moved across the screen with ink-blocking stencil, forcing ink past the threads of the woven mesh in the open areas. A significant characteristic of screen printing is that a greater thickness of the ink can be applied to the substrate than with other printing techniques. Screen-printing is therefore also preferred when ink deposits with the thickness having a value between about 10 to 50 μm or greater are required which cannot (easily) be achieved with other printing techniques. Generally, a screen is made of a piece of porous, finely woven fabric called mesh stretched over a frame of e.g. aluminum or wood. Currently most meshes are made of man-made materials such as synthetic or steel threads. Preferred synthetic materials are nylon or polyester threads.

In addition to screens made on the basis of a woven mesh based on synthetic or metal threads, screens have been developed out of a solid metal sheet with a grid of holes. Such screens are prepared by a process comprising of electrolytically forming a metal screen by forming in a first electrolytic bath a screen skeleton upon a matrix provided with a separating agent, stripping the formed screen skeleton from the matrix and subjecting the screen skeleton to an electrolysis in a second electrolytic bath in order to deposit metal onto said skeleton.

There are three types of screen printing presses, namely flat-bed, cylinder and rotary screen printing presses. Flat-bed and cylinder screen printing presses are similar in that both use a flat screen and a three-step reciprocating process to perform the printing operation. The screen is first moved into position over the substrate, the squeegee is then pressed against the mesh and drawn over the image area, and then the screen is lifted away from the substrate to complete the process. With a flat-bed press the substrate to be printed is typically positioned on a horizontal print bed that is parallel to the screen. With a cylinder press the substrate is mounted on a cylinder. Flat-bed and cylinder screen printing processes are discontinuous processes, and consequently limited in speed which is generally at maximum 45 m/min in web or 3'000 sheets/hour in a sheet-fed process.

Conversely, rotary screen presses are designed for continuous, high speed printing. The screens used on rotary screen presses are for instance thin metal cylinders that are usually obtained using the electroforming method described hereabove or made of woven steel threads. The open-ended cylinders are capped at both ends and fitted into blocks at the side of the press. During printing, ink is pumped into one end of the cylinder so that a fresh supply is constantly maintained. The squeegee is fixed inside the rotating screen and squeegee pressure is maintained and adjusted to allow a good and constant print quality. The advantage of rotary screen presses is the speed which can reach easily 150 m/min in web or 10'000 sheets/hour in a sheet-fed process.

Screen printing is further described for example in *The Printing Ink Manual*, R. H. Leach and R. J. Pierce, Springer Edition, $5^{th}$ Edition, pages 58-62, in *Printing Technology*, J. M. Adams and P. A. Dolin, Delmar Thomson Learning, $5^{th}$ Edition, pages 293-328 and in *Handbook of Print Media*, H. Kipphan, Springer, pages 409-422 and pages 498-499.

According to one embodiment, the UV-Vis radiation curable coating composition described herein is a UV-Vis radiation cationically coating composition. According to another embodiment, the UV-Vis radiation curable coating composition described herein is a UV-Vis radiation hybrid curable coating composition, i.e. a composition comprising one or more cationically curable compounds and one or more free radical curable compounds.

Cationically curable compounds are cured by cationic mechanisms consisting of the activation by UV-Vis light of one or more photoinitiators which liberate cationic species, such as acids, which in turn initiate the polymerization of the compound so as to form a cured binder. Radically curable inks or compositions are cured by free radical mechanisms consisting of the activation by UV-Vis light of one or more photoinitiators which liberate free radicals which in turn initiate the polymerization process. Optionally, one or more photosensitizers may also be present. Photosensitizers are activated by one or more of the wavelengths emitted by the UV-Vis light source and reach an excited state. The excited photosensitizer either transfer energy to the one or more photoinitiators (in free-radical polymerization) or an electron (in cationic polymerization). Either process in turn initiates the polymerization process.

The light sources required to cure the UV-Vis radiation curable coating compositions described herein are selected from the group consisting of mercury lamps (preferably medium-pressure mercury lamps), UV-LED lamps and sequences thereof. Typical sequences include the use of one or more UV-LED lamps in a first step to at least partially cure the UV-Vis radiation composition and one or more medium-pressure mercury lamps in a second step. Mercury lamps advantageously emit on a wide range of wavelengths in the UV-A, UV-B and UV-C range. Accordingly, there is a large selection of photoinitiators or combinations of photoinitiator/photosensitizer having an absorption spectrum matching at least one of the emission band of the mercury lamp. UV-LED have a more limited range of wavelengths, such that only a a limited selection of photoinitiators or combination of photoinitiator/photosensitizer is efficient enough at industrial printing speed. On the other hand, UV-LEDs are less costly, require less energy (in particular, they need much less demanding heat dissipation systems), are not prone to ozone formation and have a much longer lifespan.

The UV-Vis radiation curable coating composition described herein comprises from about 75 wt-% to about 99 wt-% of the ink vehicle described herein and having a viscosity between about 100 and about 2000 mPas at 25° C. using a Brookfield viscometer (model "DV-I Prime", spindle S27 at 100 rpm for viscosities between 500 and 2000 mPas and spindle S21 at 100 rpm for viscosities equal to or lower than 500 mPas).

Suitable UV-Vis radiation coating compositions are described in the co-pending patent application PCT/EP2021/055299.

According to one embodiment, the ink vehicle described herein is a cationically curable ink vehicle (i.e. a fully cationically curable ink vehicle not comprising radically curable compounds) and comprises a1) from about 45 wt-% to about 75 wt-% of the one or more cycloaliphatic epoxides described herein and a2) from about 2 wt-% to about 15 wt-% of the one or more cationic photoinitiators, the weight percents being based on the total weight of the ink vehicle.

According to another embodiment, the ink vehicle described herein is a hybrid ink vehicle and thus comprises b1) from about 45 to about 75 wt-% of a mixture comprising the one or more cycloaliphatic epoxides described herein and the one or more radically curable compounds described herein and b2) from about 2 wt-% to about 15 wt-% of a mixture of the one or more cationic photoinitiators and the one or more free radical photoinitiators, the weight percents being based on the total weight of the ink vehicle.

The one or more cycloaliphatic epoxides described herein may be difunctional or polyfunctional. Preferably, the one or more cycloaliphatic epoxides described independently comprise at least one cyclohexane group and at least two epoxide groups.

Preferred cycloaliphatic epoxides comprise more than one cyclohexane epoxide groups and have the structural formula (I):

(I)

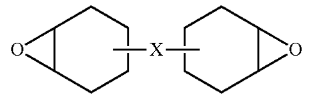

where X is selected from a single bond and a divalent group comprising one or more atoms.

According to one embodiment, X is a divalent hydrocarbon group being a straight- or branched-chain alkylene group comprising from one to eighteen carbon atoms, wherein examples of said straight- or branched-chain alkylene group include without limitation methylene group, methylmethylene group, dimethylmethylene group, ethylene group, propylene group, and trimethylene group.

According to one embodiment, X is a divalent alicyclic hydrocarbon group or cycloalkydene group such as 1,2-cyclopentylene group, 1,3-cyclopentylene group, cyclopentylidene group, 1,2-cyclohexylene group, 1,3-cyclohexylene group, 1,4-cyclohexylene group, and cyclohexylidene group.

According to one embodiment, X is a divalent group comprising one or more oxygen-containing linkage groups being —CO—, —O—CO—O—, —COO-and-O—. According to one embodiment, preferred epoxy derivatives comprising more than one cyclohexane oxide groups and having the structural formula (I), wherein X is a divalent group comprising one or more oxygen-containing linkage groups being —CO—, —O—CO—O—, —COO—, —O— have the structural formula (II), (III) or (IV):

(II)

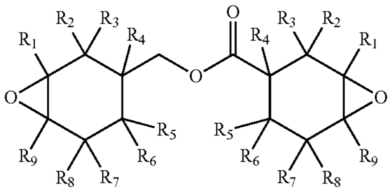

which corresponds to 3,4-epoxycyclohexylmethyl-3,4-epoxycyclohexane carboxylates wherein $R_1$-$R^9$ independently are hydrogen or linear or branched alkyl radicals containing from one to ten carbon atoms and preferably containing from one to three carbon atoms (such as methyl, ethyl, n-propyl, i-propyl, n-butyl, i-butyl, s-butyl, t-butyl, hexyl, octyl, and decyl), preferably cycloaliphatic epoxides having the structural formula (II) are 3,4-epoxycyclohexylmethyl-3,4-epoxycyclohexanecarboxylate, 3,4-epoxy-6-methyl-cyclohexylmethyl-3,4-epoxy-6-methylcyclohexanecarboxylate, 3,4-epoxy-2-methyl-cyclohexylmethyl-3,4-epoxy-2-methyl-cyclohexanecarboxylate, and 3,4-epoxy-4-methyl-cyclohexylmethyl-3,4-epoxy-4-methylcyclohexanecarboxylate;

(III)

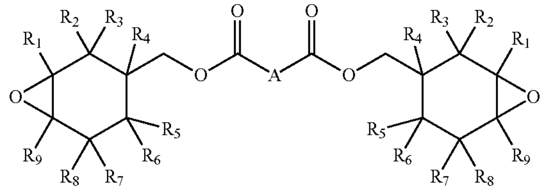

which corresponds to cycloaliphatic diepoxide esters of dicarboxylic acids, wherein $R_1$-$R^9$ independently are hydrogen or linear or branched alkyl radicals containing from one to ten carbon atoms and preferably containing from one to three carbon atoms (such as methyl, ethyl, n-propyl, isopropyl, butyl, hexyl, octyl, and decyl) and A is a valence bond or a linear or branched divalent hydrocarbon radical generally containing from one to ten carbon atoms and preferably containing from 3 to 8 carbon atoms, such as alkylene radicals (such as for example trimethylene, tetramethylene, hexamethylene and 2-ethylhexylene) and cycloaliphatic radicals (such as 1,4-cyclohexane, 1,3-cyclohexane and 1,2-cyclohexane); preferably cycloaliphatic diepoxide esters of dicarboxylic acids having the structural formula (III) are bis(3,4-epoxycyclohexylmethyl) adipate, bis(3,4-epoxy-6-methylcyclohexylmethyl) adipate, bis(3,4-epoxycyclohexylmethyl) oxalate, bis(3,4-epoxycyclohexylmethyl) pimelate, and bis(3,4-epoxycyclohexylmethyl) sebacate;

(IV)

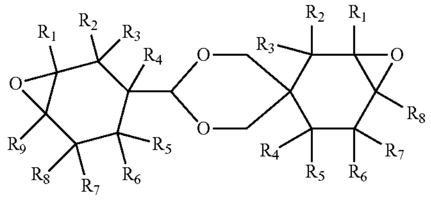

wherein $R_1$-$R_9$ independently are hydrogen or linear or branched hydrocarbon radicals containing one to three carbon atoms; a preferred example of cycloaliphatic diepoxides having the structural formula (IV) is 2-(3, 4-epoxycyclohexyl-5,5-spiro-3,4-epoxy)cyclohexane-meta-dioxane.

According to one embodiment, the one or more cycloaliphatic epoxides described herein have the structural formula (V) or (VI):

(V)

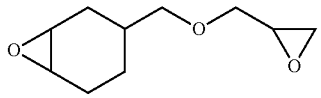

(VI)

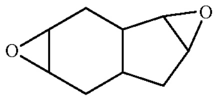

The one or more cycloaliphatic epoxides described herein may be hydroxy modified or (meth)acrylate modified. Examples are commercially available under the name Cyclomer A400 (CAS: 64630-63-3) and Cyclomer M100 (CAS: 82428-30-6) by Daicel Corp., or TTA15 and TTA16 by TetraChem/Jiangsu.

For embodiments wherein the ink vehicle described herein is a cationically curable ink vehicle (i.e. a fully cationically curable ink vehicle not comprising radically curable compounds), said ink vehicle described herein comprises from about 2 wt-% to about 15 wt-%, preferably from about 3 wt-% to about 12 wt-% and more preferably from about 4 wt-% to about 10 wt-%, of the one or more cationic photoinitiators (also referred in the art as photo-acid generators) being onium salts described herein. The onium salts described herein are preferably selected from the group consisting of azonium salts, oxonium salts, iodonium salts, sulfonium salts and mixtures thereof, more preferably selected from the group consisting of oxonium salts, iodonium salts, sulfonium salts and mixtures thereof, and still more preferably selected from the group consisting iodonium salts, sulfonium salts and mixtures thereof.

The one or more iodonium salts described herein have a cationic moiety and an anionic moiety, wherein the anionic moiety is preferably $BF_4^-$, $B(C_6F_5)_4^-$, $PF_6^-$, $AsF_6^-$, $SbF_6^-$ or $CF_3SO_3^-$, more preferably $SbF_6^-$ or $PF_6^-$, still more preferably $PF_6^-$, and wherein the cationic moiety is preferably an aromatic iodonium ion, more preferably a iodonium ion comprising two aryl groups, wherein the two aryl groups may be independently substituted by one or more alkyls groups (such as for example methyl, ethyl, isobutyl, tertbutyl, etc.) one or more alkoxy groups, one or more nitro groups, one or more halogen containing groups, one or more hydroxy groups or a combination thereof. Particularly suitable examples of iodonium salts for the present invention are commercially available under the name Omnicat 250 and 440 from IGM Resins and Speedcure 938 from Lambson.

The one or more sulfonium salts described herein have a cationic moiety and an anionic moiety, wherein the anionic moiety is preferably, $BF_4^-$, $B(C_6F_5)_4^-$, $PF_6^-$, $(PF_{6-m}(C_nF_{2n-1})_m)^-$ (where m is an integer from 1 to 5, and n is an integer from 1 to 4), $AsF_6^-$, $SbF_6^-$, $CF_3SO_3^-$, $CH_3C_6H_4)SO_3^-$, $(C_4F_9)SO_3^-$, $(CF_3)CO_2^-$, $(C_4F_9)CO_2^-$, $(CF_3SO_2)_3C^-$ or pentafluorohydroxyantimonate, more preferably $SbF_6^-$ or $PF_6^-$ and wherein the cationic moiety is preferably an aromatic sulfonium ion, more preferably a sulfonium ion comprising two or more aryl groups, wherein the two or more aryl groups may be independently substituted by one or more alkyls groups (such as for example methyl, ethyl, isobutyl, tertbutyl, etc.) one or more alkoxy groups, one or more aryloxyl groups, one or more halogen containing groups, one or more hydroxy groups or a combination thereof.

Suitable examples of sulfonium ions comprising two or more aryl groups include without limitation triarylsulfonium ions such as diphenyl[4-(phenylthio)phenyl]sulfonium ion, bis[4-(diphenylsulfonio)phenyl]sulfonium ion, triphenylsulfonium ions and tris[4-(4-acetylphenyl) sulfanylphenyl]sulfonium ion.

Other examples of useful cationic photoinitiators can be found in standard textbooks such as "Chemistry & Technology of UV & EB Formulation for Coatings, Inks & Paints", Volume III, "Photoinitiators for Free Radical Cationic and Anionic Polymerization", 2nd edition, by J. V. Crivello & K. Dietliker, edited by G. Bradley and published in 1998 by John Wiley & Sons in association with SITA Technology Limited.

For embodiments wherein the UV-Vis radiation curable coating composition herein is a UV-Vis radiation hybrid curable coating composition, the ink vehicle of said UV-Vis radiation hybrid curable coating composition comprises the one or more cycloaliphatic epoxides described herein and the one or more radically curable compounds selected from the group consisting of tri(meth)acrylates, tetra(meth)acrylates and mixtures thereof described herein, preferably selected from the group consisting of tetra(meth)acrylates wherein said one or more radically curable compounds described herein are preferably in an amount less than or equal to about 30 wt-%, the weight percents being based on the total weight of the ink vehicle.

The one or more radically curable tri(meth)acrylates described herein are preferably selected from the group consisting of trimethylolpropane triacrylates, trimethylolpropane trimethacrylates, alkoxylated (in particular ethoxylated or propoxylated) trimethylolpropane triacrylates, alkoxylated (in particular ethoxylated or propoxylated) trimethylolpropane trimethacrylates, alkoxylated (in particular ethoxylated or propoxylated) glycerol triacrylates, pentaerythritol triacrylates, alkoxylated (in particular ethoxylated or propoxylated) pentaerythritol triacrylates and mixtures thereof, preferably selected from the group consisting of trimethylolpropane triacrylates, alkoxylated (in particular ethoxylated or propoxylated) trimethylolpropane triacrylates, alkoxylated (in particular ethoxylated or propoxylated) glycerol triacrylates, pentaerythritol triacrylates and mixtures thereof.

The one or more radically curable tetra(meth)acrylates described herein are preferably selected from the group consisting of ditrimethylolpropane tetraacrylates, pentaerythritol tetraacrylates, alkoxylated (in particular ethoxylated or propoxylated pentaerythritol tetraacrylates and mixtures thereof, preferably selected from the group consisting of alkoxylated (in particular ethoxylated or propoxylated) pentaerythritol tetraacrylates.

The one or more free radical photoinitiators are preferably selected form the group consisting alpha-hydroxyketones, benzyl ketals, benzoin ethers, phosphine oxides, phenylglyoxylates and mixtures thereof, more preferably selected form the group consisting of alpha-hydroxyketones.

Suitable examples of alpha-hydroxyketones include without limitation 2-hydroxy-4'-hydroxyethoxy-2-methylpropiophenone; 1-hydroxycyclohexyl phenyl ketone; 2-hydroxy-2-methyl-1-phenylpropan-1-one; 2-hydroxy-2-methyl-1-(4-tert-butyl)phenylpropan-1-one; 2-hydroxy-1-[4-[[4-(2-hydroxy-2-methylpropanoyl)phenyl]methyl]phenyl]-2-methylpropan-1-one; 2-hydroxy-1-[4-[4-(2-hydroxy-2-methylpropanoyl) phenoxy]phenyl]-2-methylpropan-1-one; 2-hydroxy-1-[1-[4-(2-hydroxy-2-methylpropanoyl)phenyl]-1,3,3-trimethylindan-5-yl]-2-methylpropan-1-one; poly(oxy-1,2-ethanediyl), α-(1,1-dimethyl-2-oxo-2-phenylethyl)-ω-hydroxy-; and oligo[2-hydroxy-2-methyl-1-[4-(1-methylvinyl)phenyl]propanone], according to one embodiment, the alpha-hydroxyketones is 2-hydroxy-2-methyl-1-phenylpropan-1-one.

A suitable example of benzyl ketals includes without limitation 2,2-dimethoxy-2-phenylacetophenone and 2,2-diethoxy-1-phenyl-1-ethanone.

Suitable examples of benzoin ethers include without limitation 2-ethoxy-1,2-diphenylethanone; 2-isopropoxy-1,2-diphenylethanone; 2-isobutoxy-1,2-diphenylethanone and 2-butoxy-1,2-diphenylethanone.

Suitable examples of phosphine oxides include without limitation 2,3,6-trimethylbenzoyldiphenylphosphine oxide; 2,4,6-trimethylbenzoyldiphenylphosphine oxide; ethyl(2,4,6-trimethylbenzoyl)phenylphosphinate; ethyl phenyl(2,4,6-trimethylbenzoyl)phenylphosphinate; phenylbis(2,4,6-trimethylbenzoyl)phosphine oxide; bis(2,6-dimethoxybenzoyl)-2,4,4-trimethylpentylphosphine oxide; as well as oligomeric phosphine oxides such as α, α', α"-1,2,3-propanetriyltris[ω-[phenyl(2,4,6-trimethylbenzoyl)phosphinyl]oxy]-poly(oxy-1,2-ethanediyl) and α-[bis(2,4,6-trimethylbenzoyl)phosphinyl]-ω-methoxy-poly(oxy-1,2-ethanediyl.

Suitable examples of phenylglyoxylates include without limitation 2-oxo-2-phenylacetic acid methyl ester(methyl benzoylformate), 2-[2-oxo-2-phenyl-acetoxy-ethoxy]ethyl 2-oxo-2-phenylacetate, α-(2-oxo-2-phenylacetyl)-ω-[(2-oxo-2-phenylacetyl)oxy]-poly(oxy-1,4-butanediyl) and 2-(2-hydroxyethoxy)ethyl 2-oxo-2-phenylacetate.

In order to enhance reactivity and/or improve handling (for example by replacing solid photoinitiators by a liquid blend), any blends of the free radical photoinitiators described herein may be used, wherein said blends include for example: blends of 2,4,6-trimethylbenzoyldiphenylphosphine oxide and 2-hydroxy-2-methyl-1-phenylpropan-1-one, sold e.g. by IGM Resins under the tradename Omnirad 4265; blends of phenylbis(2,4,6-trimethylbenzoyl)phosphine oxide, ethyl(2,4,6-trimethylbenzoyl)phenylphosphinate and 2-hydroxy-2-methylpropiophenone, sold e.g. by IGM Resins under the tradename Omnirad 2022; blends of ethyl(2,4,6-trimethylbenzoyl)phenylphosphinate and phenylbis(2,4,6-trimethylbenzoyl)phosphine oxide, sold e.g. by IGM Resins under the tradename Omnirad 2100; blends of 2-hydroxy-2-methylpropiophenone and 1-hydroxycyclohexyl phenyl ketone, sold e.g. by IGM Resins under the tradename Omnirad 1000; blends of oligo[2-hydroxy-2-methyl-1-[4-(1-methylvinyl)phenyl]propanone] and 2-hydroxy-2-methylpropiophenone, sold e.g. by IGM Resins under the tradename Esacure KIP100F; blends of 2-hydroxy-2-methylpropiophenone), ethyl(2,4,6-trimethylbenzoyl)phenylphosphinate and oligo[2-hydroxy-2-methyl-1-[4-(1-methylvinyl)phenyl]propanone], sold by IGM Resins under the tradename Omnirad BL 723; and blends of 2-hydroxy-2-methylpropiophenone, oligo[2-hydroxy-2-methyl-1-[4-(1-methylvinyl)phenyl]propanone], ethyl(2,4,6-trimethylbenzoyl) and 2,2-dimethoxy-1,2-diphenylethan-1-one, sold by IGM Resins under the tradename Omnirad BL 724.

According to one embodiment mentioned herein, the UV-Vis radiation curable coating composition described herein is a UV-Vis radiation hybrid curable coating composition (i.e. the ink vehicle of said UV-Vis radiation curable coating composition comprises the cycloaliphatic epoxides described herein, the one or more cationic photoinitiators being onium salts described herein, the one or more radically curable compounds described herein and the one or more free radical photoinitiators described herein), the total amount of the one or more cationic photoinitiators being onium salts and the one or more free radical photoinitiators is between about 2 wt-% and about 15 wt-%, preferably between about 3 wt-% and about 12 wt-% and more preferably between about 4 wt-% and about 10 wt-%, the weight percents being based on the total weight of the ink vehicle. Preferably, the one or more cationic photoinitiators being onium salts are present in an amount between about 1 wt-% and about 10 wt-% and the one or more free radical photoinitiators are present in an amount between about 1 wt-% and about 5 wt-%, the weight percents being based on the total weight of the ink vehicle; provided that the total amount of the one or more cationic photoinitiators being onium salts and the one or more free radical photoinitiators is between about 2 wt % and about 15 wt-%, preferably between about 3 wt-% and about 12 wt-% and more preferably between about 4 wt-% and about 10 wt-%, the weight percents being based on the total weight of the ink vehicle.

The ink vehicle of the UV-Vis radiation curable coating composition described herein (the ink vehicle of the UV-Vis radiation cationically curable coating composition as well as the ink vehicle of the UV-Vis radiation hybrid curable coating composition) may further comprise c1) one or more vinyl ethers, or c2) one or more oxetanes or c3) a combination of one or more vinyl ethers and one or more oxetanes.

According to one embodiment, the UV-Vis radiation curable coating composition described herein (the ink vehicle of the UV-Vis radiation cationically curable coating composition as well as the ink vehicle of the UV-Vis radiation hybrid curable coating composition) may further comprise one or more vinyl ethers. For embodiments wherein the ink vehicle of the UV-Vis radiation curable coating composition described herein comprises the one or more vinyl ethers described herein without the one or more oxetanes described herein, said one or more vinyl ethers are present in an amount less than about 20 wt-%, preferably in an amount larger than or equal to about 5.0 wt-% and less than or equal to about 15 wt-%, the weight percents being based on the total weight of the ink vehicle.

Vinyl ethers are known in the art to accelerate curing and reduce tackiness, thus limiting the risk of blocking and set-off when the printed sheets are put in stacks just after printing and curing. They also improve the physical and chemical resistance of the printed security element and enhance the flexibility of the printed and cured ink layer, which may be advantageous when the coating composition of the invention is printed on plastic or polymer substrates. Vinyl ethers also help reducing the viscosity of the composition/ink while strongly co-polymerizing with the ink vehicle.

Examples of preferred vinyl ethers include methyl vinyl ether, ethyl vinyl ether, n-propyl vinyl ether, n-butyl vinyl ether, isobutyl vinyl ether, ethylhexyl vinyl ether, octadecyl vinyl ether, dodecyl vinyl ether, isopropyl vinyl ether, tert-butyl vinyl ether, tert-amyl vinyl ether, cyclohexyl vinyl ether, cyclohexanedimethanol monovinyl ether, cyclohexanedimethanol divinyl ether, 4-(vinyloxy methyl)cyclohexylmethyl benzoate, phenyl vinyl ether, methylphenyl vinyl ether, methoxyphenyl vinyl ether, 2-chloroethyl vinyl ether, 2-hydroxyethyl vinyl ether, 4-hydroxybutyl vinyl ether, 1,6-hexanediol monovinyl ether, ethylene glycol divinyl ether, ethylene glycol monovinyl ether, 1,4-butanediol divinyl ether, 1,6-hexanediol divinyl ether, 4-(vinyloxy) butyl benzoate, bis[4-(vinyl oxy)butyl]adipate, bis[4-(vinyloxy)butyl]succinate, bis[4-(vinyloxymethyl)cyclohexylmethyl]glutarate, 4-(vinyloxy)butyl stearate, trimethylolpropane trivinyl ether, propenyl ether of propylene carbonate, diethylene glycol monovinyl ether, diethylene glycol divinyl ether, ethylene glycol butylvinyl ether, dipropylene glycol divinyl ether, triethylene glycol divinyl ether, triethylene glycol methyl vinyl ether, triethylene glycol monobutyl vinylether, tetraethylene glycol divinyl ether, poly(tetrahydrofuran)divinyl ether, polyethyleneglycol-520 methyl vinyl ether, pluriol-E200 divinyl ether, tris[4-(vinyloxy)butyl]trimellitate, 1,4-bis(2-vinyloxyethoxy)benzene, 2,2-bis(4-vinyloxyethoxyphenyl) propane, bis[4-(vinyloxy) methyl]cyclohexyl]methyl]terephthalate, bis[4-(vinyloxy) methyl]cyclohexyl]methyl]isophthalate. Suitable vinyl ethers are commercially sold by BASF under the designation EVE, IBVE, DDVE, ODVE, BDDVE, DVE-2, DVE-3, CHVE, CHDM-di, HBVE. The one or more vinyl ethers described herein may be hydroxy modified or (meth)acrylate modified (for example: VEEA, 2-(2-Vinyloxyethoxy)ethyl acrylate from Nippon Shokubai).

According to another embodiment, the ink vehicle of the UV-Vis radiation curable coating composition described herein (the ink vehicle of the UV-Vis radiation cationically curable coating composition as well as the ink vehicle of the UV-Vis radiation hybrid curable coating composition) comprises the one or more oxetanes described herein. For embodiments wherein the ink vehicle of the UV-Vis radiation curable coating composition described herein comprises the one or more oxetanes described herein without the one or more vinyl ethers described herein, said one or more oxetanes are present in an amount less than or equal to about 30 wt-%, preferably larger than or equal to about 5 wt-% and less than or equal to about 25 wt-%, the weight percents being based on the total weight of the ink vehicle.

Oxetane compounds are known in the art to accelerate curing and reduce tackiness, thus limiting the risk of blocking and set-off when the printed sheets are put in stacks just after printing and curing. They also help reducing the viscosity of the composition/ink while strongly co-polymerizing with the ink vehicle.

Examples of oxetanes include without limitation trimethylene oxide, 3,3-dimethyloxetane, 3-ethyl-3-hydroxymethyl oxetane, 3-ethyl-3-[(2-ethylhexyloxy)methyl]oxetane, 3-ethyl-3-phenoxymethyl oxetane, bis([1-ethyl(3-oxetanyl)] methyl) ether, 1,4-bis[3-ethyl-3-oxetanyl methoxy)methyl] benzene, 3,3-dimethyl-2 (4-methoxy-phenyl)-oxetane, 4,4-bis(3-ethyl-3-oxetanyl)methoxymethyl]biphenyl and (3-ethyl-3-oxetanyl)methyl methacrylate. Preferred oxetanes are 3-ethyl-3-hydroxymethyl oxetane, bis([1-ethyl(3-oxetanyl)]methyl) ether, 3-ethyl-3-phenoxymethyl oxetane, 1,4-bis[3-ethyl-3-oxetanyl methoxy)methyl]benzene, 4,4-bis(3-ethyl-3-oxetanyl) methoxymethyl]biphenyl and (3-ethyl-3-oxetanyl)methyl methacrylate; a preferred example is 3-ethyl-3-[(2-ethylhexyloxy)methyl]oxetane.

According to another embodiment, the ink vehicle of the UV-Vis radiation curable coating composition described herein (the ink vehicle of the UV-Vis radiation cationically curable coating composition as well as the ink vehicle of the UV-Vis radiation hybrid curable coating composition) comprises the one or more vinyl ethers described herein and the one or more oxetanes described herein. For embodiments wherein the ink vehicle of the UV-Vis radiation curable coating composition described herein comprises the combination of the one or more vinyl ethers described and the one or more oxetanes described herein, said combination is present in an amount less than or equal to about 15 wt-%, preferably less than or equal to about 10 wt-%, the weight percents being based on the total weight of the ink vehicle.

A well-chosen balance of the one or more vinyl ethers described herein and the one or more oxetanes described herein, within the specified range, help optimizing the desired properties of the security element made of the coating composition of the invention, in particular easy processability (optimal viscosity, fast curing, no set-off, no blocking) and strong chemical and physical resistance. Furthermore, since vinyl ethers and oxetanes are usually cheaper than cycloaliphatic epoxide compounds, they also help enhancing cost effectiveness.

The ink vehicle of the UV-Vis radiation curable coating composition described herein (the ink vehicle of the UV-Vis radiation cationically curable coating composition as well as the ink vehicle of the UV-Vis radiation hybrid curable coating composition) may further comprise one or more polyhydroxy compounds, wherein said one or more polyhydroxy compounds are preferably present in an amount less than or equal to about 25 wt-%, the weight percents being based on the total weight of the ink vehicle.

Polyhydroxy compounds are known in the art to improve adhesion to substrates known to exhibit poor adhesion properties, such as plastic or polymer substrates that become increasingly popular in the field of security documents, in particular banknotes.

The one or more polyhydroxy compounds described herein preferably comprise more than two hydroxyl groups and may be linear, branched or hyperbranched (also referred in the art as dendritic). Preferably, the one or more polyhydroxy compounds described herein are trifunctional, tetrafunctional compounds, hexafunctional compounds or multifunctional compounds.

The one or more polyhydroxy compounds described herein are preferably selected from the group consisting of polyhydroxy derivatives of aliphatic or aromatic polyethers, polyhydroxy derivatives of polyesters, polyhydroxy derivatives of polycarbonates, glycerol, trimethylolpropane, ditrimethylolpropane, pentaerytritol, dipentaerytritol and mixtures thereof.

The one or more polyhydroxy compounds described herein may be at least partially alkoxylated. The one or more polyhydroxy compounds described herein may therefore have alkoxylated units, preferably ethoxylated and/or propoxylated units.

According to one embodiment, the one or more polyhydroxy compounds described herein are polyhydroxy derivatives of aliphatic or aromatic polyethers. Example of polyhydroxy derivatives of aliphatic or aromatic polyethers include polyoxyalkylene polyols and polyalkoxylated polyols such as for example polyethylene glycol and polypropylene glycol.

According to an embodiment, the one or more polyhydroxy compounds described herein are selected from the group consisting of trifunctional compounds, preferably glycerols and trimethylolpropanes, tetrafunctional compounds, preferably di-trimethylolpropanes and pentaerytritols, hexafunctional compounds, preferably dipentaerytritols, and mixtures thereof, wherein said compounds, preferably said trimethylolpropanes, pentaerytritols and dipentaerytritols, may be alkoxylated (ethoxylated and/or propoxylated).

Suitable examples of alkoxylated polyhydroxy compounds are sold by Perstorp under the designation Polyol 3165, 3380, 3610, 3611, 3940, 3990, R3215, R3430, R3530, R3600, 4290, 4360, 4525, 4640, 4800, R4630, R4631, R4650 and R6405, wherein the first number indicates the number of hydroxyl groups per molecule and the three following numbers indicate the hydroxyl number.

According to an embodiment, the one or more polyhydroxy compounds described herein are polyydroxy derivatives of polyesters such as polycaprolactone diols, triols and tetraols. Such compounds are for example sold as PLACCEL 200 Series, PLACCEL 300 Series, PLACCEL 400 Series, Polyglycerin 6, Polyglycerin 10 and Polyglycerin 40 by Daicel Corp.

According to an embodiment, the one or more polyhydroxy compounds described herein are hyperbranched polyhydroxy derivatives of polyesters. As used herein, the term "hyperbranched polymers" are also known as dendritic polymers, highly branched polymers, dendritic macromolecules or arborescent polymers, which are three dimensional highly branched molecules that have a treelike structure and comprise one or more branching comonomer units. The branching comonomer units comprise branching layers, one or more spacing layers, and/or a layer of chain terminating molecules as well as an optional nucleus, also known as core. Continued replication of the branching layers yields increased branch multiplicity, branch density, and an increased number of terminal functional groups, when compared to other molecules. As described for example in U.S. Pat. No. 5,418,301, hyperbranched polyhydroxy derivatives of polyesters are obtained by the controlled esterification of a polyhydroxy compound (such as for example trimethylolpropane, pentaerythritol, etc.) serving as a central nucleating molecule, with an appropriate number of equivalents of dimethylolpropionic acid, in one or several subsequent steps. Suitable examples of polyhydroxy compounds being dendritic polyhydroxy derivatives of polyesters are sold by Perstorp under the designation Boltorn™ H20, Boltorn™ H2004, Boltorn™ H311, Boltorn™ P1000 and Boltorn™ P500.

The one or more polyhydroxy compounds described herein preferably have a hydroxyl number between 100 and 1000 mg KOH/g.

The ink vehicle of the UV-Vis radiation curable coating composition described herein (the ink vehicle of the UV-Vis radiation cationically curable coating composition as well as the ink vehicle of the UV-Vis radiation hybrid curable coating composition) may further comprise one or more fillers or extenders preferably selected from the group consisting of carbon fibers, talcs, mica (muscovite), wollastonites, calcinated clays, china clays, kaolins, carbonates (e.g. calcium carbonate, sodium aluminum carbonate), silicates (e.g. magnesium silicate, aluminum silicate), sulfates (e.g. magnesium sulfate, barium sulfate), titanates (e.g. potassium titanate), alumina hydrates, silica, fumed silica, montmorillonites, graphites, anatases, rutiles, bentonites, vermiculites, zinc whites, zinc sulfides, wood flours, quartz flours, natural fibers, synthetic fibers and combinations thereof. When present, the one or more fillers or extenders are preferably present in an amount from about 0.1 wt-% to about 20 wt-%, more preferably in an amount from about 0.1 wt-% to about 10 wt-%, the weight percents being based on the total weight of the ink vehicle.

The ink vehicle of the UV-Vis radiation curable coating composition described herein (the ink vehicle of the UV-Vis radiation cationically curable coating composition as well as the ink vehicle of the UV-Vis radiation hybrid curable coating composition) may further comprise one or more photosensitizers in conjunction with the one or more photoinitiators described herein in order to achieve efficient curing. Suitable examples of photosensitizers are known to those skilled in the art (e.g. in Industrial Photoinitiators, W. A. Green, CRC Press, 2010, Table 8.1, p. 170). The one or more sensitizers described herein are preferably selected from the group consisting of thioxanthone derivatives, anthracene derivatives and benzophenone derivatives. More preferably, photosensitizers are those that are able to achieve efficient and fast curing with UV-LED light sources, such as thioxanthone derivatives and anthracene derivatives (such as 9,10-diethoxyanthracene sold as Anthracure UVS-1101 and 9,10-dibutyloxyanthracene sold as Anthracure UVS-1331, both sold by Kawasaki Kasei Chemicals Ltd). Particularly preferred are thioxanthone derivatives, including without limitation isopropyl-thioxanthone (ITX), 1-chloro-2-propoxy-thioxanthone (CPTX), 2-chloro-thioxanthone (CTX) and 2,4-diethyl-thioxanthone (DETX) and mixtures thereof. Alternatively, thioxanthone photosensitizers may be used in an oligomeric or polymeric form (such as Omnipol TX sold by IGM Resins, Genopol* TX-2 sold by Rahn, or Speedcure 7010 sold by Lambson) or in a polymerizable form (such as Omnipol 3TX sold by IGM Resins). When present, the one or more photosensitizers are preferably present in an amount from about 0.1 wt-% to about 10 wt-%, more preferably about 0.1 wt-% to about 5 wt-% and still more preferably about 0.2 wt-% to about 1 wt-%, the weight percents being based on the total weight of the ink vehicle.

The ink vehicle of the UV-Vis radiation curable coating composition described herein (the ink vehicle of the UV-Vis radiation cationically curable coating composition as well as the ink vehicle of the UV-Vis radiation hybrid curable coating composition) may further comprise one or more solvents to fine-tune the viscosity of the UV-Vis radiation curable coating composition described herein. Preferred solvents are polar aprotic solvents exhibiting a high boiling point such as carbonates. Preferred carbonates are alkylene carbonates (e.g. ethylene carbonates, propylene carbonates and butylene carbonates). Particularly preferred are propylene carbonates, which have a high boiling point and a favorable ecotoxicity profile. Preferably, the amount of the one or more solvents in the ink vehicle is less than about 5 wt-% and more preferably less than about 2 wt-%, the weight percents being based on the total weight of the ink vehicle.

For embodiments wherein the ink vehicle of the UV-Vis radiation curable coating composition described herein is a hybrid curable ink vehicle, said ink vehicle may further comprise one or more reactive diluents being radically curable monomers selected from the group consisting of mono(meth)acrylates, di(meth)acrylates and mixtures thereof.

The ink vehicle of the UV-Vis radiation curable coating composition described herein (the ink vehicle of the UV-Vis radiation cationically curable coating composition, as well as the ink vehicle of the UV-Vis radiation hybrid curable coating composition) may further comprise one or more marker substances and/or taggants including forensic markers and/or forensic taggants and/or one or more machine readable materials selected from the group consisting of magnetic materials known in the art, luminescent materials and electroluminescent materials known in the art, electrically conductive materials known in the art, infrared-absorbing materials known in the art and (surface enhanced) Raman active compounds known in the art. As used herein, the term "machine readable material" refers to a material which exhibits at least one distinctive property which is not perceptible by the naked eye, and which can be comprised in a layer so as to confer a way to authenticate said layer or article comprising said layer by the use of a particular equipment for its authentication. The one or more machine readable materials are to be chosen so that their detection in the security feature made with the UV-Vis radiation curable coating composition described herein is not impaired by the pigments comprising a flake-shaped non-metallic or metallic substrate contained by said security feature. It is within the common general knowledge of the person skilled in the art of inks formulation to select the machine readable materials to be used in a security ink taking into account the known characteristics of the pigments comprising a flake-shaped non-metallic or metallic substrate contained by said ink. A UV-Vis radiation curable coating composition as described herein, wherein the pigments comprise a flake-shaped non-metallic substrate and the ink vehicle comprises one or more machine readable materials selected from the group consisting of magnetic materials known in the art, luminescent materials and electroluminescent materials known in the art, electrically conductive materials known in the art, infrared-absorbing materials known in the art and (surface enhanced) Raman active compounds known in the art, preferably selected from the group consisting of magnetic materials known in the art and infrared-absorbing materials known in the art, and more preferably selected from the group consisting of magnetic materials known in the art, is preferred. Also preferred is a UV-Vis radiation curable coating composition as described herein, wherein the pigments comprise a flake-shaped metallic substrate and the ink vehicle comprises one or more machine readable materials selected from the group consisting of magnetic materials known in the art, luminescent materials and electroluminescent materials known in the art, electrically conductive materials known in the art and (surface enhanced) Raman active compounds known in the art, preferably selected from the group consisting of magnetic materials known in the art. Non-limiting examples of infrared-absorbing materials that are suitable for a UV-Vis radiation curable coating composition as described herein containing pigments with a flake-shaped non-metallic substrate are described in WO 2007/060133 and WO 2019/219250. Non-limiting examples of magnetic materials that are suitable for a UV-Vis radiation curable coating composition as described herein include the core-shell magnetic particles described in WO 2008/148201, WO 2010/115986, WO 2017/129666 and WO 2016/005158.

The ink vehicle of the UV-Vis radiation curable coating composition described herein (the ink vehicle of the UV-Vis radiation cationically curable coating composition as well as the ink vehicle of the UV-Vis radiation hybrid curable coating composition) may further comprise one or more coloring ingredients selected from the group consisting of organic pigment particles, inorganic pigment particles, organic dyes and mixtures thereof; and/or one or more additives. The latter include without limitation compounds and materials which are used for adjusting physical, rheological and chemical parameters of the UV-Vis radiation curable coating composition, preferably the UV-Vis radiation curable screen printing coating composition, described herein such as the consistency (e.g. anti-settling agents and plasticizers), the foaming properties (e.g. antifoaming agents and deaerators), the lubricating properties (waxes), etc. Additives described herein may be present in the ink vehicle or the UV-Vis radiation curable coating composition, described herein in amounts and in forms known in the art, including in the form of so-called nano-materials where at least one of the dimensions of the additives is in the range of 1 to 1000 nm.

According to one embodiment, the ink vehicle of the UV-Vis radiation curable coating composition described herein is a UV-Vis radiation cationically curable coating composition comprising one or more cycloaliphatic epoxides described herein (in particular the cycloaliphatic epoxides comprise more than one cyclohexane epoxide groups and have the structural formula (II)), the combination of the one or more vinyl ethers and the one or more oxetanes described herein, the one or more polyhydroxy compounds described herein and the one or more cationic photoinitiators being onium salts (in particular the one or more salts being selected from the group consisting selected from the group consisting of oxonium salts, iodonium salts, sulfonium salts and mixtures thereof and preferably iodonium salts such as those described herein), optionally the one or more photosensitizers described herein (in particular thioxanthone derivatives such as those described herein), optionally the one or more fillers described herein, preferably in the amounts described herein.

According to one embodiment, the ink vehicle of the UV-Vis radiation curable coating composition described herein is a UV-Vis radiation hybrid curable coating composition comprising one or more cycloaliphatic epoxides described herein (in particular the cycloaliphatic epoxides comprise more than one cyclohexane epoxide groups and have the structural formula (I) or (II)), the combination of the one or more vinyl ethers and the one or more oxetanes described herein, the one or more polyhydroxy compounds described herein, the one or more cationic photoinitiators being onium salts (in particular the one or more salts being selected from the group consisting selected from the group consisting of oxonium salts, iodonium salts, sulfonium salts and mixtures thereof and preferably iodonium salts such as those described herein), the one or more radically curable compounds selected from the group consisting of tri(meth)acrylates, tetra(meth)acrylates and mixtures thereof described herein (in particular tetra(meth)acrylates such as those described herein), the one or more free radical photoinitiators described herein (in particular alpha-hydroxyketones such as those described herein), optionally the one or more photosensitizers described herein (in particular thioxanthone derivatives such as those described herein), optionally the one or more fillers described herein, preferably in the amounts described herein.

The UV-Vis radiation curable coating compositions, described herein comprise from about 1 wt-% to about 25 wt-%, preferably from about 5 wt-% to about 20 wt-% and more preferably from about 10 wt-% to about 20 wt-%, of pigments comprising the flake-shaped non-metallic or metallic substrate described herein, wherein said flake-shaped non-metallic or metallic substrate is at least partially coated with the one or more at least partial coating layers described herein and comprises the at least partial surface treatment layer facing the environment and made of the one or more surface modifiers described herein. By “facing the environment”, it is meant that said surface treatment layer is the topmost layer of the pigments and acts as an outer layer. The at least partial surface treatment layer is in direct contact with the top layer of the one or more at least partial coating layers described herein.

The flake-shaped non-metallic or metallic substrate of the pigments described herein comprises one or more at least partial coatings independently made of one or more metal oxides, one or more metal oxide hydrates, one or more metal suboxides or mixtures of these materials; in other words, the non-metallic or metallic flakes described herein are at least partially coated with one or more layers made of one or more metal oxides, one or more metal oxide hydrates, one or more metal suboxides or mixtures of these materials. The thickness of the metal oxide, metal oxide hydrate, metal suboxide or the mixture thereof is usually 5 to 1000 nm, preferably 10 to 800 nm, in particular 20 to 600 nm.

As known by the man skilled in the art, the one or more at least partial coatings may be applied to the flake-shaped non-metallic or metallic substrate by precipitation methods, wet-chemical methods, sol-gel methods physical vapor deposition (PVD) processes or chemical vapor deposition (CVD) processes, wherein said methods are chosen as a function of the substrate materials and the coating materials. Alternatively, the one or more at least partial coatings made of metal oxides and/or oxide hydrates may be obtained on flake-shaped metallic substrates by chemical oxidation of the metal surface (e.g. with permanganate or other strong oxidation agents) or by heating the flake-shaped metallic pigment in air or in a controlled atmosphere (e.g. enriched in oxygen and/or in water vapor) at elevated temperature during a given amount of time, the time, temperature and atmosphere composition depending on the metal and on the desired thickness of the at least partial coatings. For example, the flake-shaped metallic pigment may be baked in an oven at 300° C. in dry air for 30 minutes in order to get the at least partial coatings made of metal oxide and/or metal hydrate The size of the pigments, expressed by the d50 value, described herein used is preferably in the range from about 1 μm to about 100 μm (microns), preferably from about 5 μm to about 50 μm (microns). The thickness of the pigments is usually between about 0.1 μm and about 5 μm (microns), preferably between about 0.2 μm and about 4 μm (microns).

According to one embodiment, the flake-shaped non-metallic substrate of the pigments described herein is preferably made of one or more materials selected from the group consisting of natural micas, synthetic micas, talcs, graphites, borosilicates (e.g. glasses) and kaolins, more preferably selected from the group consisting of natural micas, synthetic micas and glasses and still more preferably selected from the group consisting of natural micas and synthetic micas.

The flake-shaped non-metallic substrate described herein comprises one or more at least partial coatings independently made of one or more metal oxides, one or more metal oxide hydrates, one or more metal suboxides, or mixtures of these materials, preferably one or more metal oxides and/or one or more metal oxide hydrates, more preferably comprising one or more metal oxides. Suitable metal oxides include without limitation aluminum oxide, silicon oxide, iron oxides, tin oxide, cerium oxide, zinc oxide, zirconium oxide, chromium oxide, titanium oxide and any mixtures thereof. Preferably, the non-metallic substrate described herein consists of a non-metallic substrate, preferably made of a natural mica or synthetic mica, comprising one or more at least partial coatings independently made of one or more metal oxides selected from the group consisting of titanium dioxides, tin oxides, iron oxide, chromium oxide and mixtures thereof. Particularly preferred flake-shaped non-metallic substrates for the pigments described herein consist of natural micas or synthetic micas comprising one or more at least partial coatings independently made of titanium dioxide (i.e. flake-shaped mica substrate+$TiO_2$) or a mixture comprising titanium dioxide as well as natural or synthetic micas comprising more than one at least partial coatings, wherein one of said one or more at least partial coatings is made of titanium dioxide and another one of said one or more at least partial coatings is made of tin oxide (i.e. flake-shaped mica substrate+$SnO_2$+$TiO_2$ or flake-shaped mica substrate+$TiO_2$+$SnO_2$).

According to one embodiment, the flake-shaped metallic substrate of the pigments described herein consists of a single layer made of one or more metals preferably selected from the group consisting of aluminum, copper, zinc, tin, brass, iron, titanium, chromium, nickel, silver, gold, steel, alloys thereof and mixtures thereof preferably selected from the group consisting of aluminum, iron and brass. The flake-shaped metallic substrate described herein comprises one or more at least partial coatings independently made of one or more metal oxides, one or more metal oxide hydrates, one or more metal suboxides, or mixtures of these materials, preferably one or more metal oxides and/or one or more metal oxide hydrates, more preferably comprising one or more metal oxides. Suitable metal oxides include without limitation aluminum oxide, silicon oxide, iron oxides, tin oxide, cerium oxide, zinc oxide, zirconium oxide, chromium oxide and titanium oxide.

According to one embodiment, the flake-shaped metallic substrate of the pigments described herein consists of a multilayer comprising one or more metallic layers selected from the metals described herein and optionally one or more non-metallic layers.

According to one preferred embodiment, the flake-shaped metallic substrate of the pigments described herein consists of a multilayer comprising one or more metallic layers and optionally one or more non-metallic layers being thin film interference multilayers comprising a Fabry-Perot reflector/dielectric/absorber multilayer structures such as those disclosed in U.S. Pat. Nos. 4,705,300; 4,705,356; 4,721,271; 5,084,351; 5,214,530; 5,281,480; 5,383,995; 5,569,535, 5,571,624 and in the thereto related documents. Preferably, the multi layers comprising one or more metallic layers described herein are thin film interference pigments comprising a Fabry-Perot absorber/dielectric/reflector/dielectric/absorber multilayer structure, wherein the absorber layers are partially transmitting and partially reflecting, the dielectric layers are transmitting and the reflective layer is reflecting the incoming light. Preferably, the reflector layer is selected from the group consisting of metals, metal alloys and combinations thereof, preferably selected from the group consisting of reflective metals, reflective metal alloys and combinations thereof and more preferably selected from the group consisting of aluminum, chromium, nickel, and mixtures thereof and still more preferably aluminum. Preferably, the dielectric layers are independently selected from the group consisting of magnesium fluoride, silicon dioxide and mixtures thereof and more preferably magnesium fluoride. Preferably, the absorber layers are independently selected from the group consisting of chromium, nickel, metallic alloys and mixtures thereof and more preferably chromium. Particularly preferred thin film interference multilayers comprise a Fabry-Perot absorber/dielectric/reflector/dielectric/absorber multilayer structure comprising a $Cr/MgF_2/Al/MgF_2/Cr$ multilayer structure. The flake-shaped metallic substrate of the pigments described herein consisting of a thin film interference multilayer further comprises an at least partial coating made of one or more metal oxides, one or more metal oxide hydrates, one or more metal suboxides, one or more metal fluorides, or mixtures of these materials, preferably one or more metal oxides and/or one or more metal oxide hydrates, more preferably comprising one or more metal oxides. Preferred metal oxides are aluminum oxides, silicon oxide, iron oxides, tin oxide, cerium oxide, zinc oxide, zirconium oxide, chromium oxide and titanium oxide, preferably chromium oxide and mixtures thereof.

The flake-shaped non-metallic or metallic substrate further comprises the at least partial surface treatment layer described herein, wherein said surface treatment layer faces the environment and is in direct contact with the top layer of the one or more at least partial coating layers. In other words, the at least partial surface treatment layer described herein is present on the top layer coating of the one or more at least partial coatings. The at least partial surface treatment layer described herein is made of one or more surface modifiers selected from perfluoropolyethers, said perfluoropolyethers being functionalized with one or more phosphor (P) containing compounds or one or more silicon (Si) containing compounds. The functionalized perfluoropolyethers described herein are preferably functionalized with one or more phosphate containing groups, one or more silane containing groups or one or more siloxane containing groups.

The surface modification can take place in a variety of ways. For example, the one or more surface modifiers described herein may be dissolved in an organic solvent and/or water and are subsequently applied to the flake-shaped non-metallic or metallic substrates comprising the one or more at least partial coating layers described herein by mixing and subsequently the so-obtained pigments are dried. Alternatively, the surface treatment with the one or more surface modifiers may take place immediately after the flake-shaped non-metallic or metallic substrate has been at least partially coated with the one or more at least partial coating layers described herein in a one-pot process. An optional calcination step may be carried out on the flake-shaped non-metallic or metallic substrates comprising the one or more at least partial coating layers described herein prior to the surface treatment.

The one or more surface modifiers described herein preferably have a weight average molecular weight below about 2000 g/mol eq PS as measured according to the method described herein.

According to one embodiment, the one or more surface modifiers described herein are perfluoropolyethers (i.e. comprising the structure-$CH_2O—(CF_2)_m—(CF_2—CF_2—O)_n—CF_2—$) being functionalized with one or more phosphor (P) containing groups or one or more silicon (Si) containing groups, in particular perfluoropolyethers having one or more phosphate groups or perfluoropolyether compounds having one or more silane.

According to one embodiment, the one or more surface modifiers described herein consist of (perfluoropolyethers being mono- or bifunctionalized with one or more phosphate groups, preferably phosphoric or phosphonic ester groups, more preferably alkoxylated perfluoropolyether compounds derivatives having phosphate groups, preferably phosphoric or phosphonic ester groups. Preferably, the one or more surface modifiers described herein are (perfluoropolyethers of the following formula (VII):

$$(OH)_2(O)P—[(OCH_2CH_2)_p—OCH_2—R^f—CH_2O—(CH_2CH_2O)_pP(O)OH]_q,OH \quad \text{(VII)}$$

wherein p=1-2, q=1-4 and $R^f$ is $CH_2O—(CF_2)_m—(CF_2—CF_2—O)_n—CF_2$. A particularly suitable example of surface modifiers for the present invention is commercially available under the name Fluorolink® P54 from Solvay.

According to another embodiment, the one or more surface modifiers described herein are perfluoropolyethers being functionalized with one or more silane groups, preferably alkoxylated silane groups. Preferably, the one or more surface modifiers described herein consist of perfluoropolyethers of the following formula (VIII):

$$(OH)_{3-n}—(R^{II}O)_nSi—R^I—NH—C(O)—CF_2O—(CF_2—CF_2—O)_p—(CF_2O)_q—CF_2—C(O)—NH—R^I—Si(OR^{II})_n(OH)_{3-n} \quad \text{(VIII)}$$

wherein $R^I$ is alkylene from 1 to 10 carbon atoms, preferably from 1 to 5 carbon atoms, still more preferably from 2 to 4 carbon atoms; $R^{II}$ is a linear or branched alkyl group from 1 to 4 carbon atoms, preferably from 1 to 3 carbon atoms; n is an integer from 0 to 3, preferably 3; p and q are numbers such that the q/p ratio is between 0.2 and 4; and p is different from zero. Preferably, the one or more surface modifiers described herein are perfluoropolyethers functionalized with silane groups of the following formula (IX):

$$(EtO)_3—Si—R^I—NH—C(O)—CF_2O—(CF_2—CF_2—O)_p—(CF_2O)_q—CF_2—C(O)—NH—R^I—Si(OEt)_3 \quad \text{(IX)}$$

wherein $R^I$ is alkylene from 1 to 10 carbon atoms, preferably from 1 to 5 carbon atoms, still more preferably from 2 to 4 carbon atoms and p and q are numbers such that the q/p ratio is between 0.2 and 4; and p is different from zero. A particularly suitable example of surface modifiers for the present invention is commercially available under the name Fluorolink® S10 from Solvay with the following formula (X):

$$(EtO)_3—Si—CH_2CH_2CH_2—NH—C(O)—CF_2O—(CF_2—CF_2—O)_p—(CF_2O)_q—CF_2—C(O)—NH—CH_2CH_2CH_2—Si(OEt)_3 \quad \text{(X)}$$

wherein p=2-6 and q=2-4.

The present invention further provides methods for producing the UV-Vis radiation curable inks, described herein and inks obtained therefrom. The UV-Vis radiation curable inks described herein may be prepared by dispersing or mixing the components of the ink vehicle described herein, i.e. the one or more cycloaliphatic epoxides, the one or more radically curable compounds when present, the cationic photoinitiators being onium salts, the one or more free radical photoinitiators when present and the optional additives described herein, with the pigments described herein, wherein all of said compounds may be dispersed or mixed in a single step or wherein the ink vehicle is first prepared and then the pigments described herein are added and the so-obtain mixture is dispersed or mixed. The one or more photoinitiators described herein may be added either during the dispersing or mixing step of all other ingredients or may be added at a later stage, i.e. after the formation of the inks.

The method described herein further comprises, subsequently to the step a) described herein, the step b) of applying the top coating composition described herein at least partially on top of the coating layer (x10) described herein. The top coating composition described herein is applied in the form of the one or more indicia (x30) described herein and partially overlaps (i.e. overlaps in at least one area) the coating layer (x10) described herein, wherein the UV-Vis radiation curable coating composition comprising the pigments comprising the flake-shaped non-metallic or metallic substrate described herein of the coating layer (x10) is still in a wet and unpolymerized state.

As used herein, the term “indicia” shall mean continuous and discontinuous layers consisting of distinguishing markings or signs or patterns. Preferably, the one or more indicia (x30) described herein are selected from the group consisting of codes, symbols, alphanumeric symbols, motifs, geometric patterns (e.g. circles, triangles and regular or irregular polygons), letters, words, numbers, logos, drawings, portraits and combinations thereof. Examples of codes include encoded marks such as an encoded alphanumeric data, a one-dimensional barcode, a two-dimensional barcode, a QR-code, datamatrix and IR-reading codes. The one or more indicia (x30) described herein may be solids indicia and/or raster indicia.

The top coating composition described herein is applied in the form of the one or more indicia described herein (x30) by an application process preferably a contactless fluid microdispensing process, preferably selected from the group consisting of spray coating, aerosol jet printing, electrohydrodynamic printing, slot die coating and inkjet printing, more preferably by an inkjet printing process, wherein said contactless fluid microdispensing printing processes are variable information printing methods allowing for the unique production of the one or more indicia (x30) on or in the security features described herein. The application process is chosen as a function of the design and resolution of the one or more indicia to be produced.

The top coating composition described herein is applied as described herein with an ink deposit of at least about 5 $g/m^2$, preferably at least about 6 $g/m^2$ and more preferably at least about 9 $g/m^2$, the ink deposit in $g/m^2$ being measured as described hereafter in the experimental part (i.e. by subtracting from the weight obtained after step b) (substrate (x20) carrying the screen printed layer (x10) and the inkjet printed indicium (x30)) the weight obtained after step a) (substrate (x20) carrying the screen printed layer (x10). According to one embodiment, the top coating composition described herein is applied as described herein with an ink deposit between about 5 $g/m^2$ and about 20 $g/m^2$, preferably between about 6 $g/m^2$ and about 20 $g/m^2$ and more preferably between about 9 $g/m^2$ and about 20 $g/m^2$, the ink deposit in $g/m^2$ being measured as described hereafter in the experimental part (i.e. by subtracting from the weight obtained after step b) (substrate (x20) carrying the screen printed layer (x10) and the inkjet printed indicium (x30)) the weight obtained after step a) (substrate (x20) carrying the screen printed layer (x10).

Inkjet printing might be advantageously used for producing security features exhibiting the one or more indicia described herein comprising variable halftones. Inkjet halftone printing is a reprographic technique that simulates continuous-tone imagery, comprising an infinite number of colors or greys, by the application of variable ink deposits or grammages.

Spray coating is a technique involving forcing the composition through a nozzle whereby a fine aerosol is formed. A carrier gas and electrostatic charging may be involved to aid in directing the aerosol at the surface that is to be printed. Spray printing allows to print spots and lines. Suitable compositions for spray printing typically have a viscosity between about 10 mPa·s and about 1 Pa·s (25° C., 1000 $s^{-1}$ as described above). Resolution of spray coating printing lies in the millimeter range. Spray printing is described for example in F. C. Krebs, Solar Energy Materials & Solar Cells (2009), 93, page 407.

Aerosol jet printing (AJP) is an emerging contactless direct write approach aimed at the production of fine features on a wide range of substrates. AJP is compatible with a wide material range and freeform deposition, allows high resolution (in the order of about 10 micrometers) coupled with a relatively large stand-off distance (e.g. 1-5 mm), in addition to the independence of orientation. The technology involves aerosol generation using either ultrasonic or pneumatic atomizer to generate an aerosol from compositions typically having a viscosity between about 1 mPa·s and about 1 Pa·s (25° C., 1000 $s^{-1}$ as described above). Aerosol jet printing is described for example in N. J. Wilkinson et al., The International Journal of Advanced Manufacturing Technology (2019) 105:4599-4619.

Electrohydrodynamic inkjet printing is a high resolution inkjet printing technology. Electrohydrodynamic inkjet printing technology makes use of externally applied electric fields to manipulate droplets sizes, ejection frequencies and placement on the substrate to get higher resolution than convention inkjet printing, while keeping a high production speed. The resolution of electrohydrodynamic inkjet printing is about two orders of magnitude higher than conventional inkjet printing technology; thus, it can be used for the orienting of nano- and micro-scale patterns. Electrohydrodynamic inkjet printing may be used both in DOD or in continuous mode. Compositions for electrohydrodynamic inkjet printing typically have a viscosity between 1 mPa·s and about 1 Pa·s (25° C., 1000 $s^{-1}$ as described above). Electrohydrodynamic inkjet printing technology is described for example P. V. Raje and N. C. Murmu, International Journal of Emerging Technology and Advanced Engineering, (2014), 4 (5), pages 174-183.

Slot die-coating is a 1-dimensional coating technique. Slot-die coating allows for the coating of stripes of material which is well suited for making a multilayer coating with stripes of different materials layered on top of each other. The alignment of the pattern is produced by the coating head being translated along the direction perpendicular to the direction of the web movement. A slot die-coating head comprises a mask that defines the slots of the coating head through which the slot-die coating ink is dispersed. An example of a slot-die coating head is illustrated in F. C. Krebs, Solar Energy Materials & Solar Cells (2009), 93, page 405-406. Suitable compositions for slot die-coating typically have a viscosity between 1 mPa·s and about 20 mPa·s (25° C., 1000 $s^{-1}$ as described above).

According to one embodiment, the top coating composition described herein is printed in the form of the one or more indicia (x30) described herein by an inkjet printing process, preferably a continuous inkjet (CI) printing process or a drop-on-demand (DOD) inkjet printing process, more preferably a drop-on-demand (DOD) inkjet printing process. Drop-on-demand (DOD) printing is a non-contact printing process, wherein the droplets are only produced when required for printing, and generally by an ejection mechanism rather than by destabilizing a jet. Depending on the mechanism used in the printhead to produce droplets, the DOD printing is divided in piezo impulse, thermal jet, valve jet (viscosity between 1 mPa·s and about 50 mPa·s (25° C., 1000 $s^{-1}$ as described above) and electrostatic process.

According to a preferred embodiment, the top coating composition described herein is a DOD top coating composition preferably having a viscosity less than about 50 mPa·s, more preferably viscosity between about 0.5 mPa·s and about 40 mPa·s and still more preferably viscosity between about 0.5 mPa·s and about 30 mPa·s, at 25° C. and 1000 $s^{-1}$ using a rotational viscosimeter DHR-2 from TA Instruments, having a cone-plane geometry and a diameter of 40 mm.

According to one embodiment for ink vehicles of the UV-Vis radiation cationically curable coating compositions described herein, the top coating composition described herein may comprise one or more cationically curable compounds, one or more hybrid curable compounds, one or more solvents, a blend of one or more radically curable compounds and one or more radical photoinitiators or a mixture thereof; wherein the one or more cationically curable compounds may be those described herein for the UV-Vis radiation curable coating composition described herein, preferably selected from the group consisting of vinyl ethers, propenyl ethers, cyclic ethers such as epoxides, glycidyl ethers, oxetanes, and tetrahydrofuranes, and mixtures thereof such as those described herein and more preferably selected from the group consisting of vinyl ethers, cyclic ethers such as epoxides, glycidyl ethers, oxetanes and mixtures thereof such as those described herein; wherein the glycidyl ethers are selected from the group consisting of monoglycidyl ethers (including for example alkyl (such as for example methyl, ethyl, propyl, isopropyl, butyl, tertbutyl, 2-ethylhexyl and C8-C18 (used alone or in mixtures thereof)) monoglycidyl ethers, cycloalkyl (such as for example cyclopropyl, cyclobutyl, cyclopentyl and cyclohexyl) monoglycidyl ethers, alkenyl (such as for example allyl and crotyl) monoglycidyl ethers, alkynyl (such as for example propargyl) monoglycidyl ethers, phenyl (such as for example phenyl, cresyl, tertbutylphenyl and nonyl phenyl) monoglycidyl ethers) and furfuryl monoglycidyl ethers), diglycidyl ethers (including for example diglycidyl ether, 1,2-propanediol diglycidyl ether, 1,3-propanediol diglycidyl ether, 1,4-butanediol diglycidyl ether, 1,6-hexanediol diglycidyl ether, neopentyl glycol diglycidyl ether, cyclohexane dimethanol diglycidyl ether, 4,4'-dihydroxyphenyl-2,2-propane diglycidyl ether, resorcinol diglycidyl ether, bisphenol A diglycidyl ether, bisphenol F diglycidyl ether, polyethylene glycol diglycidyl ether, polypropylene glycol diglycidyl ether and polyglycol diglycidyl ether), triglycidyl ethers (including for example glycerol triglycidyl ether, trimethylolethane triglycidyl ether, trimethylol propane triglycidyl ether, triphenylolmethane triglycidyl, ether castor oil triglycidyl ether, propoxylated glycerin triglycidyl ether), tetraglycidyl ethers (including for example pentaerythritol tetraglycidyl ether and 1,1,2,2-tetrakis(hydroxyphenyl) ethane tetraglycidyl ether), polyglycidyl ethers (including for example sorbitol polyglycidyl ether and poly-phenol poly-glycidyl ether) and mixtures thereof; should the one or more glycidyl ethers have a viscosity not suitable for inkjet printing, the top coating composition described herein comprises said one or more glycidyl ethers in combination with one or more monoglycidyl ethers and/or one or more diglycidyl ethers and/or one or more solvents to reduce the viscosity; wherein the one or more hybrid curable compounds are hydroxy modified or (meth)acrylate modified vinyl ethers, in particular VEEA, 2-(2-Vinyloxyethoxy)ethyl acrylate from Nippon Shokubai and methyl 2-((allyloxy)methyl) acrylate (AOMA™) from Nippon Shokubai;

wherein the one or more solvents are selected from the group consisting of alcohols (in particular ethanol), ketones (in particular cyclic ketones such as cyclopentanone and cyclohexanone), glycols, glycol ethers (in particular dipropylene glycol methyl ether), ether esters (in particular ethyl 3-ethoxypropionate), glycol ether esters (in particular propylene glycol methyl ether acetate), alkylene carbonates (in particular propylene carbonate) and mixtures thereof; and wherein the one or more radically curable compounds are selected from the group consisting of mono(meth) acrylates, di(meth)acrylates, tri(meth)acrylates such as those described herein, tetra(meth)acrylates such as those described herein and mixtures thereof and one or more free radical photoinitiators such as those described herein (in particular alpha-hydroxyketones such as those described herein), wherein suitable mono (meth)acrylates may be selected from the group consisting of alkyl (meth)acrylates, cycloalkyl (meth)acrylates (such as for example 3,3,5-trimethylcyclohexyl acrylate and isobornyl acrylate), benzyl (meth)acrylates, phenyl (meth)acrylates (including phenoxyalkyl (meth)acrylates such as phenoxyethyl acrylate), cyclic trimethylolpropane formal acrylate, tetrahydrofurfuryl acrylate, aliphatic urethane (meth)acrylates and alkoxylated (in particular ethoxylated or propoxylated) compounds thereof, and suitable di(meth)acrylates include ethylene glycol diacrylate, glycol dimethacrylate, butanediol di(meth)acrylate, 2-methyl-1,3-propanediol diacrylate, 3-methyl-1,5-pentanediol diacrylate, 2-butyl-2-ethyl-1,3-propanediol diacrylate, 1,6-hexanediol di(meth)acrylate, neopentyl glycol di(meth) acrylate, 1,9-nonanediol di(meth)acrylate, 1,10-decaanediol di(meth)acrylate, alkoxylated (in particular ethoxylated and propoxylated) 1,6-hexanediol diacrylates, propoxylated neopentyl glycol diacrylate, ethoxylated 2-methyl-1,3-propanediol diacrylate, tricyclodecanedimethanol diacrylate, diethylene glycol di(meth)acrylate, dipropylene glycol diacrylate, triethylene glycol di(meth)acrylate, tripropylene glycol di(meth)acrylate, tetraethylene glycol di(meth)acrylate and polyethylene glycol 200/400/600 di(meth)acrylates, and wherein the radical photoinitiators are selected from the group consisting of hydroxyketones (e.g. alpha-hydroxyketones), benzyl ketals, benzoin ethers, phosphine oxides, phenylglyoxylates and mixtures thereof, more preferably selected form the group consisting of phosphine oxides, hydroxyketones, phenylglyoxylates and mixtures thereof, still more preferably hydroxyketones (e.g. alpha-hydroxyketones).

Optionally, and with the aim of improving the curing efficiency of ink vehicles of the UV-Vis radiation cationically curable coating compositions described herein, the top coating composition described herein may further comprise one or more cationically curable photoinitiators.

According to one embodiment for ink vehicles of the UV-Vis radiation hybrid curable coating composition described herein, the top coating composition described herein may comprise one or more cationically curable compounds, one or more hybrid curable compounds, one or more solvents, one or more radically curable compounds or a mixture thereof;

wherein the one or more cationically curable compounds may be those described herein for the UV-Vis radiation curable coating composition described herein, preferably selected from the group consisting of vinyl ethers, propenyl ethers, cyclic ethers such as epoxides, glycidyl ethers, oxetanes, and tetrahydrofuranes, and mixtures thereof such as those described herein and more preferably selected from the group consisting of vinyl ethers, glycidyl ethers, oxetanes and mixtures thereof such as those described herein;

wherein the one or more hybrid curable compounds are hydroxy modified or (meth)acrylate modified vinyl ethers, in particular VEEA, 2-(2-Vinyloxyethoxy)ethyl acrylate from Nippon Shokubai and methyl 2-((allyloxy)methyl)acrylate (AOMA™) from Nippon Shokubai;

wherein the one or more solvents are selected from the group consisting of alcohols (in particular ethanol), ketones (in particular cyclic ketones such as cyclopentanone and cyclohexanone), glycols, glycol ethers (in particular dipropylene glycol methyl ether), ether esters (in particular ethyl 3-ethoxypropionate), glycol ether esters (in particular propylene glycol methyl ether acetate), alkylene carbonates (in particular propylene carbonate) and mixtures thereof; and wherein the one or more radically curable compounds are selected from the group consisting of mono(meth) acrylates such as those described herein, di(meth)acrylates such as those described herein, tri(meth)acrylates such as those described herein, tetra(meth)acrylates such as those described herein and mixtures thereof.

Optionally, and with the aim of improving the curing efficiency of ink vehicles of the UV-Vis radiation hybrid curable coating composition described herein, the top coating composition described herein may further comprise one or more cationically curable photoinitiators and/or one or more radically curable photoinitiators such as those described herein.

For embodiments wherein the top coating composition is applied by an inkjet printing process, said top coating composition may further comprises conventional additives and ingredients such as for example reactive diluents, wetting agents, antifoams, surfactants and mixtures thereof that are used in the field of radiation curable inkjet.

The top coating composition described herein may further comprise the one or more marker substances or taggants and/or the one or more machine readable materials such as those described for the UV-Vis radiation curable coating composition comprising the pigments comprising the flake-shaped non-metallic or metallic substrate described herein, provided that the size of said substances, taggants, or machine readable materials is suitable for the application process described herein.

The method described herein further comprises subsequently to the step b), the step c) of curing the coating layer (x10) and the one or more indicia (x30) with one or more curing units (x50). Preferably, the curing step c) described herein is carried out with one or more curing units (x50) selected from the group consisting of mercury lamps (preferably medium-pressure mercury lamps), UV-LED lamps and sequences thereof. On the contrary to medium-pressure mercury lamps that have emission bands in the UV-A, UV-B and UV-C regions of the electromagnetic spectrum, UV-LED lamps emit radiation in the UV-A region (365-405 nm). As mentioned herein, the typical sequences include the use of one or more UV-LED lamps in a first step to partially cure the UV-Vis radiation composition and one or more medium-pressure mercury lamps in a second step. Mercury lamps advantageously emit on a wide range of wavelengths in the UV-A, UV-B and UV-C range.

The time between the step b) described herein and the step c) described herein is smaller than about 30 seconds, preferably smaller than 10 seconds, preferably smaller than about 3 seconds, more preferably smaller than about 1 second.

The present invention provides the methods described herein to produce security features exhibiting one or more indicia (x30) on the substrates (x20) described herein and substrates (x20) comprising one or more security features obtained thereof and security features exhibiting the one or more indicia (x30) described herein and produced by the methods described herein. The shape of the security features described herein may be continuous or discontinuous. According to one embodiment, the shape of the coating layer (x10) represent one or more indicia, dots and/or lines, wherein said indicia may have the same shape as the one or more indicia (x30) made of the top coating composition described herein or may have a different shape.

The substrates described herein are preferably selected from the group consisting of papers or other fibrous materials (including woven and non-woven fibrous materials), such as cellulose, paper-containing materials, glasses, metals, ceramics, plastics and polymers, metallized plastics or polymers, composite materials and mixtures or combinations of two or more thereof. Typical paper, paper-like or other fibrous materials are made from a variety of fibers including without limitation abaca, cotton, linen, wood pulp, and blends thereof. As is well known to those skilled in the art, cotton and cotton/linen blends are preferred for banknotes, while wood pulp is commonly used in non-banknote security documents. Typical examples of plastics and polymers include polyolefins such as polyethylene (PE) and polypropylene (PP) including biaxially oriented polypropylene (BOPP), polyamides, polyesters such as poly(ethylene terephthalate) (PET), poly(1,4-butylene terephthalate) (PBT), poly(ethylene 2,6-naphthoate) (PEN) and polyvinylchlorides (PVC). Spunbond olefin fibers such as those sold under the trademark Tyvek® may also be used as substrate. Typical examples of metalized plastics or polymers include the plastic or polymer materials described hereabove having a metal disposed continuously or discontinuously on their surface. Typical examples of metals include without limitation aluminum, chromium, copper, gold, silver, alloys thereof and combinations of two or more of the aforementioned metals. The metallization of the plastic or polymer materials described hereabove may be done by an electrodeposition process, a high-vacuum coating process or by a sputtering process. Typical examples of composite materials include without limitation multilayer structures or laminates of paper and at least one plastic or polymer material such as those described hereabove as well as plastic and/or polymer fibers incorporated in a paper-like or fibrous material such as those described hereabove. Of course, the substrate can comprise further additives that are known to the skilled person, such as fillers, sizing agents, whiteners, processing aids, reinforcing or wet strengthening agents, etc.

If desired, a primer layer may be applied to the substrate prior to the step a). This may enhance the quality of the security feature described herein and/or promote adhesion. Examples of such primer layers may be found in WO 2010/058026 A2.

Also described herein are methods of manufacturing a security document or a decorative element or object, comprising a) providing a security document or a decorative element or object, and b) providing the one or more security features described herein, in particular such as those obtained by the method described herein, so that it is comprised by the security document or decorative element or object.

The present invention further provides security documents comprising the substrate described herein and the security feature described herein or security documents comprising more than one of the security features described herein. Security documents include without limitation value documents and value commercial goods. Typical examples of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets or titles and the like. The term "value commercial good" refers to packaging material, in particular for pharmaceutical, cosmetics, electronics or food industry that may be protected against counterfeiting and/or illegal reproduction in order to warrant the content of the packaging like for instance genuine drugs. Example of these packaging material include without limitation labels such as authentication brand labels, tamper evidence labels and seals. Preferably, the security document described herein is selected from the group consisting of banknotes, identity documents, right-conferring documents, driving licenses, credit cards, access cards, transportation titles, vouchers and secured product labels. Alternatively, the security features described herein may be produced onto an auxiliary substrate such as for example a security thread, security stripe, a foil, a decal, a window or a label and consequently transferred to a security document in a separate step.

With the aim of further increasing the security level and the resistance against counterfeiting and illegal reproduction of security documents, the substrate described herein may contain printed, coated, or laser-marked or laser-perforated indicia, watermarks, security threads, fibers, planchettes, luminescent compounds, windows, foils, decals, primers and combinations of two or more thereof.

With the aim of increasing the durability through soiling or chemical resistance and cleanliness and thus the circulation lifetime of security documents or with the aim of modifying their aesthetical appearance (e.g. optical gloss), one or more protective layers may be applied on top of the security features or security document described herein. When present, the one or more protective layers are typically made of protective varnishes which may be transparent or slightly colored or tinted and may be more or less glossy. Protective varnishes may be radiation curable compositions, thermal drying compositions or any combination thereof. Preferably, the one or more protective layers are made of radiation curable. More preferably UV-Vis radiation curable compositions.

The security features exhibiting one or more indicia (x30) described herein may be provided directly on a substrate on which it shall remain permanently (such as for banknote applications). Alternatively, a security feature may also be provided on a temporary substrate for production purposes, from which the security feature is subsequently removed. Thereafter, after hardening/curing of the UV-Vis radiation curable coating compositions described herein for the production of the security feature, the temporary substrate may be removed from the security feature.

Alternatively, in another embodiment an adhesive layer may be present on the security feature or may be present on the substrate comprising said security feature, said adhesive layer being on the side of the substrate opposite to the side where the security feature is provided or on the same side as the security feature and on top of the security feature. Therefore, an adhesive layer may be applied to the security feature or to the substrate, said adhesive layer being applied after the curing step has been completed. Such an article may be attached to all kinds of documents or other articles or items without printing or other processes involving machinery and rather high effort. Alternatively, the substrate described herein comprising the security feature described herein may be in the form of a transfer foil, which can be applied to a document or to an article in a separate transfer step. For this purpose, the substrate is provided with a release coating, on which the security feature is produced as described herein. One or more adhesive layers may be applied over the so produced security feature.

Also described herein are substrates, security documents, decorative elements and objects comprising more than one, i.e. two, three, four, etc. security feature described herein. Also described herein are articles, in particular security documents, decorative elements or objects, comprising the security feature described herein.

As mentioned hereabove, the security features described herein may be used for protecting and authenticating a security document or decorative elements.

Typical examples of decorative elements or objects include without limitation luxury goods, cosmetic packaging, automotive parts, electronic/electrical appliances, furniture and fingernail articles.

Security documents include without limitation value documents and value commercial goods. Typical example of value documents include without limitation banknotes, deeds, tickets, checks, vouchers, fiscal stamps and tax labels, agreements and the like, identity documents such as passports, identity cards, visas, driving licenses, bank cards, credit cards, transactions cards, access documents or cards, entrance tickets, public transportation tickets, academic diploma or titles and the like, preferably banknotes, identity documents, right-conferring documents, driving licenses and credit cards. The term "value commercial good" refers to packaging materials, in particular for cosmetic articles, nutraceutical articles, pharmaceutical articles, alcohols, tobacco articles, beverages or foodstuffs, electrical/electronic articles, fabrics or jewelry, i.e. articles that shall be protected against counterfeiting and/or illegal reproduction in order to warrant the content of the packaging like for instance genuine drugs. Examples of these packaging materials include without limitation labels, such as authentication brand labels, tamper evidence labels and seals. It is pointed out that the disclosed substrates, value documents and value commercial goods are given exclusively for exemplifying purposes, without restricting the scope of the invention.

Examples

The present invention is now described in more details with reference to non-limiting examples. The Examples below provide more details for the preparation of security features obtained by applying top coating inkjet inks (IJ1-IJ16) in the shape of an indicium (x30) on a layer (x10) made of UV-Vis radiation cationically or hybrid curable screen printing inks comprising surface treated pigments (SP1-SP4) and curing said indicium (x30) and said layer (x10) with a curing unit (x50).

The UV-Vis radiation cationically or hybrid curable screen printing inks used in all examples comprised pigments (P1/P2) comprising a flake-shaped non-metallic or metallic substrate, wherein the surface of said pigments has been independently treated with a surface modifier being a perfluoropolyether being functionalized with one or more phosphor (P) containing groups. Table 1 provides a description of the pigments (P1/P2) comprising a flake-shaped non-metallic or metallic substrate, wherein the surface of said pigments has been independently treated with a surface modifier being a perfluoropolyether being functionalized with one or more phosphor (P) containing groups.

Tables 2A and 2B provides a description of the used UV-Vis radiation cationically or hybrid curable screen printing inks.

Tables 3A and 3B provide a description of the top coating inkjet inks (IJ1-IJ16) to be applied on the layer (x10) made of the screen printing inks in the shape of an indicium (square or name SICPA).

Tables 4A and 4B provide the optical properties of security features obtained by the process of the invention (Examples E1-E27) and comparative processes (C1-C9), wherein the top coating inkjet ink was applied at different ink deposit values (g/m$^2$) and wherein the UV-Vis radiation cationically or hybrid curable screen printing inks comprised the first type of pigments (P1).

Table 5 provides the optical properties of security features obtained by the process of the invention (Examples E28-E33) and comparative processes (C10-C11), when the time between the application of the top coating inkjet ink in the shape of an indicium (x30) partially on top of the layer (x10) and the curing of said indicium (x30) and said layer (x10) was modified and wherein the UV-Vis radiation cationically or hybrid curable screen printing inks comprised the first type of pigments (P1).

Tables 6A and 6B provide the optical properties of security features obtained by the process of the invention (Examples E34-E58), wherein the composition of the top coating inkjet ink was modified and wherein the UV-Vis radiation cationically or hybrid curable screen printing inks comprised the first type of pigments (P1).

Tables 7A and 7B provide the optical properties of security features obtained by the process of the invention (Examples E59-E63), wherein the UV-Vis radiation cationically or hybrid curable screen printing inks comprised the second type of pigments (P2).

Table 8 provides the optical properties of security features obtained by the process of the invention (Examples E64-E66) with different substrates (a fiduciary cotton substrate, a fiduciary cotton substrate comprising a primer described in Table 9 and a polymer substrate).

A. Preparation of the Surface-Treated Pigments Comprising a Flake-Shaped Non-Metallic or Metallic Substrate (P1-P2)

TABLE 1

| Surface-treated pigments | | | |
|---|---|---|---|
| | Pigments (supplier) | Surface treatment agent (supplier) | Amount [wt-%] |
| P1 | Pyrisma ® Yellow [a] T30-20 (Merck) | Fluorolink ® P54 Perfluoropolyether functionalized with phosphate groups (CAS No 200013-65-6) (Solvay) | 2 |
| P2 | ChromaFlair ® blue-to-red [b] (Viavi Solutions) | | 4 |

[a] mica flakes coated with titanium oxide/tin oxide and having a D50 value of 14-19 μm,
[b] Fabry-Perot 5-layers optically variable flakes having a chromium oxide top layer and having a d50 value of 17-21 μm.

The pigment flakes were surface-treated as described hereabove.

Method 1 (Fluorolink® P54 for Treating Flakes Pyrisma® Yellow T30-20 (Merck))

In a 50 mL polypropylene test tube, 2 g of pigment flakes were added to 17.2 g of isopropanol (Brenntag-Schweizer, 99%) at room temperature. 0.8 g of a 10 wt-% solution of Fluorolink® P54 (procedure described for method 1a) were added and the tube was shaken vigorously for 2 minutes. After sedimentation of the pigment flakes, the top layer of solvent was removed with a syringe and the pigment flakes were subsequently washed two times with 20 g of isopropanol (Brenntag-Schweizer, 99%) and one time with 20 g of acetone (Brenntag-Schweizer, 99%). The so-obtained surface-treated pigment flakes were dried on a paper filter at room temperature for 30 minutes.

Method 2 (Fluorolink® P54 for Treating Flakes ChromaFlair® (Viavi Solutions))

Fluorolink® P54 (Solvay, 20 wt-% in water) was dissolved in an equivalent amount of isopropanol (Brenntag-Schweizer, 99%) so as to yield a 10 wt-% solution.

In a 1 liter polypropylene beaker, 50 g of pigment flakes were added to 440 g of isopropanol (Brenntag-Schweizer, 99%) and dispersed at room temperature using a Dispermat (LC220-12) for 10 minutes at 600 rpm. 10 g of said 10 wt-% solution of Fluorolink® P54 were added to the dispersion and further dispersed at room temperature for 15 minutes at 600 rpm. The resulting dispersion was poured on a Büchner funnel equipped with a filter paper under vacuum (water pump) and washed three times with 200 g isopropanol (Brenntag-Schweizer, 99%) and one last time with 200 g acetone (Brenntag-Schweizer, 99%). Finally, the surface-treated pigment flakes were dried under vacuum for 5 minutes.

B. Preparation of the UV-Vis Radiation Curable Screen Printing Inks (SP1-SP4) and the Top Coating Inkjet Inks (IJ1-IJ16)

B1. UV-Vis Radiation Cationically or Hybrid Curable Screen Printing Inks (SP1-SP4)

TABLE 2A

| Ingredients of the UV-Vis radiation curable screen printing ink vehicles | | |
|---|---|---|
| Ingredient | Commercial name (supplier) | Chemical name (CAS number) |
| Cycloaliphatic epoxide | Uvacure ® 1500 (Allnex) | 3,4-epoxycyclohexylmethyl-3,4-epoxycyclohexanecarboxylate (2386-87-0) |
| Vinyl ether | DVE-2 (BASF) | diethylene glycol divinyl ether (764-99-8) |
| Oxetane | Curalite ™Ox (Perstorp) | 3-ethyloxetane-3-methanol (3047-32-3) |
| Tetraacrylate | MIRAMER M4004 (Rahn) | ethoxylated pentaerythritol tetraacrylates (51728-26-8) |
| Polyhydroxy compound | POLYOL R4631 (Perstorp) | pentaerythritol, ethoxylated and propoxylated (30374-35-7) |
| Cationic photoinitiator | Omnicat 440 (IGM) | bis(p-tolyl)iodonium hexafluorophosphate (60565-88-0) |
| Free radical photoinitiator | Omnirad 1173 (IGM) | 2-hydroxy-2-methylpropiophenone (7473-98-5) |
| Sensitizer | GENOCURE ® ITX (Rahn) | 2-isopropyl-9H-thioxanthen-9-one (5495-84-1) |
| Filler | Aerosil ® 200 (Evonik) | silicon dioxide (7631-86-9) |
| Antifoaming agent | Tego ® Airex 900 (Evonik) | siloxanes and silicones, di-Me, reaction products with silica (67762-90-7) |
| Solvent | Propylene carbonate (Brenntag-Schweizerhalle) | propylene carbonate (108-32-7) |

TABLE 2B

| Composition (in wt-%) of the UV-Vis radiation cationically or hybrid curable screen printing inks (SP1-SP4) | | | | | |
|---|---|---|---|---|---|
| | Ingredient | SP1 (cationic) | SP2 (cationic) | SP3 (hybrid) | SP4 (hybrid) |
| Ink vehicle | Cycloaliphatic epoxide | 57.2 | 57.2 | 36.8 | 36.8 |
| | Vinyl ether | 4.2 | 4.2 | 4.2 | 4.2 |
| | Oxetane | 4.2 | 4.2 | 4.2 | 4.2 |
| | Tetraacrylate | — | — | 16.6 | 16.6 |
| | Polyhydroxy compound | 8.3 | 8.3 | 8.3 | 8.3 |
| | Cationic photoinitiator | 3.4 | 3.4 | 3.4 | 3.4 |
| | Free radical photoinitiator | — | — | 3.8 | 3.8 |

TABLE 2B-continued

Composition (in wt-%) of the UV-Vis radiation cationically or hybrid curable screen printing inks (SP1-SP4)

| | Ingredient | SP1 (cationic) | SP2 (cationic) | SP3 (hybrid) | SP4 (hybrid) |
|---|---|---|---|---|---|
| | Sensitizer | 0.4 | 0.4 | 0.4 | 0.4 |
| | Filler | 1.7 | 1.7 | 1.7 | 1.7 |
| | Antifoaming agent | 2.1 | 2.1 | 2.1 | 2.1 |
| | Solvent | 1.5 | 1.5 | 1.5 | 1.5 |
| Ink | Pigments P1 | 17 | — | 17 | — |
| | Pigments P2 | — | 17 | — | 17 |

All ingredients except the pigments (i.e. the ingredients of the ink vehicle) described in Table 2B were mixed and dispersed at room temperature using a Dispermat (model CV-3) for 15 minutes at 1000-1500 rpm so as to obtain 100 g of each of the ink vehicle. The viscosity values were independently measured on about 15 g of the ink vehicle at 25° C. on a Brookfield viscometer (model "DV-I Prime", spindle S27 at 100 rpm) and the so-obtained values were 633 mPas and 526 mPas, respectively for SP1-SP2 and SP3-SP4.

17 wt-% of the pigments (P1/P2) were independently added to 83 wt-% of the respective ink vehicle and dispersed at room temperature using a Dispermat (model CV-3) for 5 minutes at 800-1000 rpm so as to obtain 20 g of each of the UV-Vis radiation cationically or hybrid curable screen printing inks (SP1-SP4).

B2. Preparation of the Top Coating Inkjet Inks (IJ1-IJ16)

TABLE 3A

Ingredients of the top coating inkjet inks (IJ1-IJ16)

| Ingredient | Commercial name (supplier) | Chemical name (CAS number) |
|---|---|---|
| Glycidyl ether | Araldite ® DY-E (Hunstmann) | C12-C14 monoglycidyl ether(68609-97-2) |
| Cycloaliphatic epoxide | UVACURE ® 1500 (Allnex) | 3,4-epoxycyclohexylmethyl-3,4-epoxycyclohexanecarboxylate (2386-87-0) |
| Vinyl ether | DVE-2 (BASF) | diethylene glycol divinyl ether (764-99-8) |
| Vinyl ether | DVE-3 (BASF) | triethylene glycol divinyl ether (765-12-8) |
| Oxetane | Curalite ™OX (Perstorp) | 3-ethyloxetane-3-methanol (3047-32-3) |
| Oxetane | UviCure S140 (Lambson) | 3-ethyl-3-[(phenylmethoxy)methyl]-oxetane (18933-99-8) |
| Modified vinyl ether | VEEA (Nippon Shokubai) | 2-(2-Vinyloxyethoxy)ethyl acrylate (86273-46-3) |
| Monoacrylate | GENOMER 1120 (Rahn) | 3,3,5-trimethylcyclohexyl acrylate (86178-38-3) |
| Diacrylate | SR341 (Sartomer) | 3-methyl-1,5-pentanediyl diacrylate (64194-22-5) |
| Diacrylate | MIRAMER M282 (Rahn) | poly(oxy-1,2-ethanediyl), α-(1-oxo-2-propen-1-yl)-ω-[(1-oxo-2-propen-1-yl)oxy]-(26570-48-9) |
| Triacrylate | MIRAMER M3190 (Rahn) | ethoxylated (EO3) trimethylolpropane triacrylate (28961-43-5) |
| Tetraacrylate | MIRAMER M4004 (Rahn) | ethoxylated pentaerythritol tetraacrylates (51728-26-8) |
| Solvent | DOWANOL DPM (Brenntag-Schweizerhalle) | (2-methoxymethylethoxy)propanol (34590-94-8) |
| Solvent | UCAR ESTER EEP (Brenntag-Schweizerhalle) | ethyl 3-ethoxypropionate (763-69-9) |
| Solvent | Propylene carbonate (Brenntag-Schweizerhalle) | propylene carbonate (108-32-7) |
| Solvent | Ethanol (Brenntag-Schweizerhalle) | ethanol (64-17-5) |
| Photoinitiator | Omnirad 1173 (IGM) | 2-hydroxy-2-methylpropiophenone (7473-98-5) |

TABLE 3B

Top coating inkjet inks (IJ1-IJ16)

| | Composition | Viscosity [mPas] |
|---|---|---|
| IJ1 | Araldite ® DY-E | 4 |
| IJ2 | UviCure S140 | 8 |
| IJ3 | Curalite ™ Ox | 13 |
| IJ4 | DVE-3 | 4 |
| IJ5 | 25 wt-% UVACURE ® 1500 + 75 wt-% DVE-3 | 6 |
| IJ6 | VEEA | 4 |
| IJ7 | GENOMER 1120 | 5 |
| IJ8 | SR341 | 6 |
| IJ9 | MIRAMER M282 | 25 |
| IJ10 | 60 wt-% GENOMER 1120 + 40 wt-% MIRAMER M4004 | 11 |
| IJ11 | 60 wt-% GENOMER 1120 + 40 wt-% MIRAMER M3190 | 13 |
| IJ12 | DOWANOL DPM | 5 |
| IJ13 | Ethyl 3-ethoxypropionate | 1 |
| IJ14 | Propylene carbonate | 3 |
| IJ15 | Ethanol | 1 |
| IJ16 | 95.4 wt-% GENOMER 1120 + 4.6 wt-% Omnirad 1173 | 5 |

The top coating inkjet inks comprising more than one ingredients (IJ5, IJ10, IJ11 and IJ16) were independently prepared by mixing the ingredients for 10 minutes at room temperature and at 1000 rpm using a Dispermat CV-3. The viscosity of the top coating inkjet inks was determined at $1000s^{-1}$ and 25° C. using a rotational viscosimeter DHR-2 (TA Instruments) having a cone-plane geometry and a diameter of 40 mm.

The following substrates were used in the examples:

Examples E1-E63 and E66, comparative examples $C_1$-$C_{11}$: polymer BOPP (Guardian® by CCL Secure);

Example E64: fiduciary paper (Louisenthal BNP 100 $g/m^2$);

Example E65: fiduciary paper (Louisenthal BNP 100 $g/m^2$) with a primer layer described in Table 9.

C. Preparation and Evaluation of the Security Features

C-1. Preparation of the Security Features (E1-E66 and C1-C11)

Step a): the UV-Vis radiation cationically or hybrid curable screen printing inks (SP1-SP4) were independently applied by hand on a piece of substrate described hereabove, having a dimension of 60 mm×60 mm (x20) using a 90T (230 mesh) screen so as at obtain a screen printed layer (x10) having a thickness of about 20 μm and forming a square with the following dimensions: 40 mm×40 mm.

Subsequently to step a), step b): the top coating inkjet inks (IJ1-IJ16) were independently applied by a DOD (drop-on-demand) inkjet printing process using a KM1024i inkjet head (Konica Minolta) on the screen printed layers (x10) so as to obtain an indicium having the shape of a square with the following dimension: 25 mm×25 mm, said indicium being approximately centered on the square formed by the screen printing layer (x10) obtained after step a).

Subsequently to step b), step c): the screen printed layer (x10) obtained after step a) and the inkjet printed indicium (x30) obtained after step b) were cured by exposure to a UV-LED lamp from Phoseon (Type FireLine 125×20 mm, 395 nm, 8 W/$cm^2$) for about 0.5 second.

This process allowed the production of security features comprising a first area made of the cured screen printed layer (x10) lacking the cured inkjet printed indicium (x30) and a second area made of the combination of the screen printed layer (x10) and the cured inkjet printed indicium (x30). As shown on FIGS. 1A-C, FIGS. 2A-C, FIGS. 3A-C and FIGS. 4A-C, the first area corresponds to a surrounding zone having a width of about 7.5 mm of the security feature while the second area corresponds to the central zone with the following dimension: 25 mm×25 mm.

The top coating inkjet inks were independently applied in the shape of an indicium (square) partially on top of the screen printed layers (x10) so as to produce the examples prepared according to comparative processes (C1-C9) and the examples prepared according to the present invention (E1-E27) with a variable ink deposit value varying from about 3 to about 17 g/$m^2$ while the time between step b) and step c) was fixed at 0.5 seconds.

The determination of the ink deposit of the indicium made of the top coating inkjet ink applied on the second area was carried out as described herein for the example prepared according to comparative process (C2) and the examples prepared according to the present invention (E4-E6). For each example, the determination was made from three samples and the ink deposit was calculated as an average of said three samples. The procedure was as follows.

- the UV-Vis radiation hybrid curable screen printing ink SP1 was applied on the polymer substrates (x20) as described above in step a) to produce the screen printing layer (x10), each of the polymer substrates (x20) comprising said screen printing layer (x10) was then independently weighted using an analytical balance (Mettler Toledo XS64),
- the top coating inkjet ink IJ2 was applied in the shape of the indicium partially on top of said screen printing layer (x10) according to step b) with four different ink deposits and the polymer substrate (x20) comprising said screen printing layer (x10) and the inkjet printed indicium (x30) was then independently weighted using the analytical balance,
- the absolute top coating inkjet ink deposit was calculated for each sample by subtracting from the weight obtained after step b) (substrate (x20) carrying the screen printed layer (x10) and the inkjet printed indicium (x30)) the weight obtained after step a) (substrate (x20) carrying the screen printed layer (x10), and
- the inkjet ink deposit in [g/$m^2$], as provided in Table 4A for examples E4-E6 and comparative example $C_2$, was obtained by dividing the absolute inkjet ink deposit by the known printed area (25×25 mm, or 0.000625 $m^2$).

The ink deposits for all other examples were directly taken from the results obtained by the procedure described hereabove for the examples E4-E6 and the comparative example C2 (using fixed printing settings for each ink deposit).

The same method described hereabove has been used to prepare the comparative examples C10-C11 and examples E28-E33 with the exception that the time between step b) and step c) was varied between about 0.5 second and about 60 seconds while the inkjet ink deposit was fixed at about 9.4 g/$m^2$.

The same method described hereabove has been used to prepare the examples E34-E63 with an ink deposit value of about 9.4 g/$m^2$ while the time between step b) and step c) was fixed at 0.5 seconds.

The same method described hereabove has been used to prepare the examples E64-E66 with the exception that the substrate has been changed (fiduciary cotton paper (E56), fiduciary cotton paper coated with a primer (E65) and a transparent window of a polymer substrate (E66)).

C-2. Assessment of the Optical Properties

The optical properties of the so-obtained security features were not only visually assessed but also by using a goniospectrometer (Goniospektrometer Codec WI-10 5&5 by Phyma GmbH Austria). The visual assessment aimed at reproducing the way average people on the street would observe the security feature, while the assessment using the goniospectrometer closely mimics machine detection using a dedicated device (such as in high-speed sorting machines).

The visual assessment was carried out as follows:

- the contrast was observed under diffuse illumination (such as the light coming through a window with no direct sunlight), the substrate (X20) carrying the security feature being held vertically against the diffuse light source and the angle of view being chosen such that the diffuse light is not blocked by the head of the observer (meaning at a vertical angle comprised between about 70° and about) 20°. The observer reported how the contrast increases between about 70° and about 45° and decreases again between about 45° and about 20°. The following scale was used: excellent, good, sufficient, insufficient, wherein insufficient contrast refers to security features that cannot be easily assessed by the observer being unsuitable as security features.

The assessment using the goniospectrometer was carried out as follows:

- Reference samples (indicated as R1-R4 in Tables 4-8) were obtained for each of the UV-Vis radiation cationically or hybrid curable screen printing inks (SP1-SP4) using the same process as described hereabove under step a) and c) (i.e. omitting the step b) of inkjet printing). In other words, each reference samples (R1-R4) consisted of the substrate (x20) described hereabove comprising a cured screen printed layers (x10) with the dimension provided hereabove and lacking the inkjet printed indicium (x30));
- the L*a*b* values of the reference samples (R1-R4) were determined at 45° to the normal with illumination at 45° (denoted as 45°/45° in the Tables). The C* (chroma or color saturation) value was calculated from a* and b* values according to the CIELAB (1976) color space, wherein:

$$C^* = \sqrt{(a^*)^2 + (b^*)^2}$$

- the provided C* values of the reference samples (R1-R4) correspond to the chroma of the first area made of the cured screen printed layer (x10) (referred to C* (first area) in the Tables); the provided C* values of the comparative examples prepared according to comparative processes (C1-C11) and the examples prepared according to the present invention (E1-E66) corresponds to the chroma of the second area made of the combination of the screen printed layer (x10) and the cured inkjet printed indicium (x30) (referred to C* (second area) in the Tables);

from both C* values, a contrast value in % (referred to Contrast [%] in the Tables) was derived according to the following formula:

$$\text{Contrast [\%]} = \frac{C^*(\text{first area}) - C^*(\text{second area})}{C^*(\text{first area})} * 100$$

wherein a contrast of about 5% is known to be detectable by a dedicated device, and hence correspond to the threshold value for security applications. Accordingly, a contrast between about 5% and about 15% has been considered as sufficient, a contrast between about 15% and about 30% has been considered as good and a contrast above 30% has been considered as excellent for the machine detection of security features.

D. Results

D1. Variation of Inkjet Ink Deposit (C1-C9 and E1-E27)

TABLE 4A

Results of security features made with a UV-Vis radiation cationically or hybrid curable screen printing ink and top coating inkjet inks (C1-C4 and E1-E12)

| | Screen printing ink | Reference | Inkjet ink | Inkjet ink deposit [g/m²] | C* (45°/45°) first area | C* (45°/45°) second area | Contrast [%] | Visual assessment |
|---|---|---|---|---|---|---|---|---|
| C1 | SP1 | R1 | IJ1 | 3.0 | 55 | 55 | 0 | insufficient |
| E1 | SP1 | R1 | IJ1 | 6.7 | 55 | 47 | 15 | good |
| E2 | SP1 | R1 | IJ1 | 9.4 | 55 | 36 | 35 | good |
| E3 | SP1 | R1 | IJ1 | 17 | 55 | 22 | 60 | excellent |
| C2 | SP1 | R1 | IJ2 | 3.0 | 55 | 54 | 2 | insufficient |
| E4 | SP1 | R1 | IJ2 | 6.7 | 55 | 50 | 9 | sufficient |
| E5 | SP1 | R1 | IJ2 | 9.4 | 55 | 44 | 20 | sufficient |
| E6 | SP1 | R1 | IJ2 | 17 | 55 | 41 | 25 | good |
| C3 | SP1 | R1 | IJ14 | 3.0 | 55 | 53 | 4 | insufficient |
| E7 | SP1 | R1 | IJ14 | 6.7 | 55 | 46 | 16 | sufficient |
| E8 | SP1 | R1 | IJ14 | 9.4 | 55 | 42 | 24 | good |
| E9 | SP1 | R13 | IJ14 | 17 | 55 | 36 | 35 | excellent |
| C4 | SP1 | R1 | IJ16 | 3.0 | 55 | 53 | 4 | insufficient |
| E10 | SP1 | R1 | IJ16 | 6.7 | 55 | 45 | 18 | good |
| E11 | SP1 | R1 | IJ16 | 9.4 | 55 | 29 | 47 | excellent |
| E12 | SP1 | R1 | IJ16 | 17 | 55 | 25 | 55 | excellent |

TABLE 4B

Results of security features made with a UV-Vis radiation hybrid curable screen printing ink and top coating inkjet inks (C5-C9 and E13-E27)

| | Screen printing ink | Reference | Inkjet ink | Inkjet ink deposit [g/m²] | C* (45°/45°) first area | C* (45°/45°) second area | Contrast [%] | Visual assessment |
|---|---|---|---|---|---|---|---|---|
| C5 | SP3 | R3 | IJ1 | 3.0 | 49 | 47 | 4 | insufficient |
| E13 | SP3 | R3 | IJ1 | 6.7 | 49 | 43 | 12 | good |
| E14 | SP3 | R3 | IJ1 | 9.4 | 49 | 30 | 39 | good |
| E15 | SP3 | R3 | IJ1 | 17 | 49 | 29 | 41 | excellent |
| C6 | SP3 | R3 | IJ2 | 3.0 | 49 | 47 | 4 | insufficient |
| E16 | SP3 | R3 | IJ2 | 6.7 | 49 | 35 | 29 | sufficient |
| E17 | SP3 | R3 | IJ2 | 9.4 | 49 | 32 | 35 | good |
| E18 | SP3 | R3 | IJ2 | 17 | 49 | 24 | 51 | excellent |
| C7 | SP3 | R3 | IJ6 | 3.0 | 49 | 47 | 4 | insufficient |
| E19 | SP3 | R3 | IJ6 | 6.7 | 49 | 42 | 14 | sufficient |
| E20 | SP3 | R3 | IJ6 | 9.4 | 49 | 37 | 24 | good |
| E21 | SP3 | R3 | IJ6 | 17 | 49 | 27 | 45 | excellent |
| C8 | SP3 | R3 | IJ14 | 3.0 | 49 | 47 | 4 | insufficient |
| E22 | SP3 | R3 | IJ14 | 6.7 | 49 | 36 | 27 | good |
| E23 | SP3 | R3 | IJ14 | 9.4 | 49 | 33 | 33 | good |
| E24 | SP3 | R3 | IJ14 | 17 | 49 | 31 | 37 | good |
| C9 | SP3 | R3 | IJ7 | 3.0 | 49 | 48 | 2 | insufficient |
| E25 | SP3 | R3 | IJ7 | 6.7 | 49 | 42 | 14 | sufficient |
| E26 | SP3 | R3 | IJ7 | 9.4 | 49 | 32 | 35 | good |
| E27 | SP3 | R3 | IJ7 | 17 | 49 | 27 | 45 | excellent |

As shown in Tables 4A-B, the process according to the present invention requires a minimum amount of inkjet ink deposit of about 5 $g/m^2$ so as to obtain a sufficient contrast between the first and the second areas (said contrast being either visually assessed and/or by using the goniospectrometer) for UV-Vis radiation cationically or hybrid curable screen printing inks (E1-E27). As shown in Tables 4A-B, an amount of at least about 9 $g/m^2$ (E2, E3, E5, E6, E8, E9, E11, E12, E14, E15, E17, E18, E20, E21, E23, E24, E26 and E27) allowed the production of security features exhibiting good or excellent contrast, both visually and using the goniospectrometer.

Figure 1:
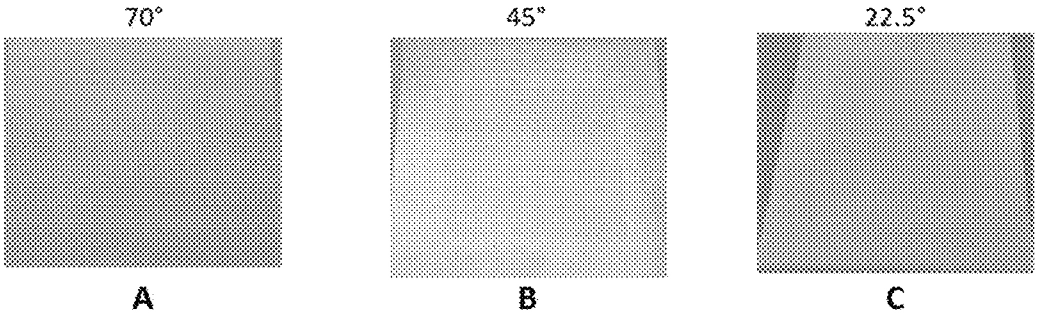
FIG. 1 show pictures of a security feature prepared with a comparative method, said security feature being observed under diffuse illumination at angles 70° (FIG. 1A), 45° (FIG. 1B) and 22.5° (FIG. 1C).

As illustrated by the pictures shown in FIG. 1A-C (pictures of security feature observed under diffuse illumination at angles 70° (FIG. 1A), 45° (FIG. 1B) and 22.5° (FIG. 1C), the contrast of the security feature made with the comparative process C7 cannot be observed with the naked eye at 70°, barely increases at 45° and cannot again be observed at 22.5°, thus making the security feature C7 obtained with the comparative process unstable for security applications.

As illustrated by the pictures shown in FIGS. 2A-C, 3A-C and 4A-C (pictures of security feature observed under diffuse illumination at angles 70° (FIGS. 2-4A), 45° (FIGS. 2-4B) and 22.5° (FIGS. 2-4C) and contrary to the comparative example C7 shown in FIG. 1A-C, the contrast of the security feature E19 made with the process according to the invention cannot be observed with the naked eye at 70°, increases at 45° and can barely be observed at 22.5°, thus making the security feature E19 made with the process according to the invention sufficient for security applications. The contrast of the security feature E20 made with the process according to the invention cannot be observed with the naked eye at 70°, increases at 45° and can be observed at 22.5°, thus making the security feature E20 obtained with the process according to the invention good for security applications. The contrast of the security feature E21 made with the process according to the invention cannot be observed with the naked eye at 70°, strongly increases at 45° and can be observed at 22.5°, thus making the security feature E21 obtained with the process according to the invention excellent for security applications.

D2. Variation of Time (Seconds) Between Step b) and Step c) (C10-C11 and E28-E33)

TABLE 5

Results of security features made with UV-Vis radiation cationically or hybrid curable screen printing inks and a top coating inkjet ink (C10-11 and E28-E33)

| | Screen printing ink | Reference | Inkjet ink | Time between steps B and C [seconds] | C* (45°/45°) first area | C* (45°/45°) second area | Contrast [%] | Visual assessment |
|---|---|---|---|---|---|---|---|---|
| C10 | SP1 | R1 | IJ2 | 60 | 55 | 53 | A | insufficient |
| E28 | SP1 | R1 | IJ2 | 10 | 55 | 49 | 11 | sufficient |
| E29 | SP1 | R1 | IJ2 | 3 | 55 | 49 | 11 | sufficient |
| E30 | SP1 | R1 | IJ2 | 0.5 | 55 | 44 | 20 | good |
| C11 | SP3 | R3 | IJ2 | 60 | 49 | 47 | 4 | insufficient |
| E31 | SP3 | R3 | IJ2 | 10 | 49 | 40 | 18 | sufficient |
| E32 | SP3 | R3 | IJ2 | 3 | 49 | 39 | 20 | sufficient |
| E33 | SP3 | R3 | IJ2 | 0.5 | 49 | 32 | 35 | good |

As shown in Table 5, the contrast of security features obtained by the process according to the present invention using UV-Vis radiation cationically or hybrid curable screen printing inks decreases when the time between steps b) and c) increases. During processes using industrial printing machines with a rotary screen press in a sheet-fed process, a time of 1 second between step b) and step c) corresponds to about 3000 sheets/hour, a time of 0.5 second corresponds to about 6000 sheets/minutes and a time of 0.3 second corresponds to about 9000 sheets/minutes. Those times are therefore fully compatible with the demanding requirements of a high-speed printing industrial environment.

D3. Variation of the Composition of the Top Coating Inkjet Inks (E34-E58)

TABLE 6A

Results of security features made with a UV-Vis radiation cationically curable screen printing inks and a top coating inkjet ink (E34-E43)

| | Screen printing ink | Reference | Inkjet ink | C* (45°/45°) first area | C* (45°/45°) second area | Contrast [%] | Visual assessment |
|---|---|---|---|---|---|---|---|
| E34 | SP1 | R1 | IJ1 | 55 | 36 | 35 | good |
| E35 | SP1 | R1 | IJ2 | 55 | 44 | 20 | good |
| E36 | SP1 | R1 | IJ3 | 55 | 48 | 13 | good |
| E37 | SP1 | R1 | IJ4 | 55 | 42 | 24 | excellent |

TABLE 6A-continued

Results of security features made with a UV-Vis radiation cationically curable screen printing inks and a top coating inkjet ink (E34-E43)

| | Screen printing ink | Reference | Inkjet ink | C* (45°/45°) first area | C* (45°/45°) second area | Contrast [%] | Visual assessment |
|---|---|---|---|---|---|---|---|
| E38 | SP1 | R1 | IJ5 | 55 | 47 | 15 | sufficient |
| E39 | SP1 | R1 | IJ6 | 55 | 40 | 27 | sufficient |
| E40 | SP1 | R1 | IJ13 | 55 | 45 | 00 | good |
| E41 | SP1 | R1 | IJ14 | 55 | 42 | 24 | excellent |
| E42 | SP1 | R1 | IJ15 | 55 | 50 | 9 | good |
| E43 | SP1 | R1 | IJ16 | 55 | 29 | 47 | excellent |

As shown in Table 6A, the method described herein, wherein the UV-Vis radiation cationically curable screen printing inks described herein is used, the viscosity of said UV-Vis radiation curable screen printing ink is between about 100 and about 2000 mPas at 25° C. (as measured with the method described herein), the inkjet ink deposit is at least about 5 g/$m^2$, preferably at least about 6 g/$m^2$ and more preferably at least about 9 g/$m^2$ (as measured with the method described herein), the viscosity of the top coating composition is less than about 30 mPas at 1000 $s^{-1}$ and 25° C. and the time between steps b) and c) is smaller than about 30 seconds, preferably smaller than 10 seconds, preferably smaller than about 3 seconds, more preferably smaller than about 1 second, allows the production of security features exhibiting one or more indicia and exhibiting sufficient contrast for security applications by using top coating compositions selected from the group consisting of cationically curable top coating compositions (IJ1-IJ5, wherein the top coating composition comprises one or more glycidyl ethers, one or more vinyl ethers, one or more cycloaliphatic epoxides or mixtures thereof), hybrid curable top coating compositions (IJ6, wherein the top coating composition comprises one or more hydroxy modified or (meth)acrylate modified vinyl ethers), solvent-based top coating compositions (IJ13-15, wherein the top coating composition comprises one or more alcohols (in particular ethanol), ether-esters (in particular ethyl 3-ethoxypropionate), alkylene carbonates (in particular propylene carbonate)) and radically curable top coating compositions further comprising one or more free radical photoinitiators (IJ16, wherein the top coating composition comprises one or more (meth)acrylate compounds (in particular monoacrylates) and one or more free radical photoinitiators (IJ16) (in particular alpha-hydroxyketones)).

TABLE 6B

Results of security features made with UV-Vis radiation hybrid curable screen printing inks and top coating inkjet inks (E44-E58)

| | Screen printing ink | Reference | Inkjet ink | C* (45°/45°) first area | C* (45°/45°) second area | Contrast [%] | Visual assessment |
|---|---|---|---|---|---|---|---|
| E44 | SP3 | R3 | IJ1 | 49 | 30 | 39 | good |
| E45 | SP3 | R3 | IJ2 | 49 | 32 | 35 | good |
| E46 | SP3 | R3 | IJ3 | 49 | 35 | 29 | excellent |
| E47 | SP3 | R3 | IJ4 | 49 | 35 | 29 | excellent |
| E48 | SP3 | R3 | IJ5 | 49 | 23 | 53 | excellent |
| E49 | SP3 | R3 | IJ6 | 49 | 37 | 24 | sufficient |
| E50 | SP3 | R3 | IJ7 | 49 | 32 | 35 | sufficient |
| E51 | SP3 | R3 | IJ8 | 49 | 35 | 29 | good |
| E52 | SP3 | R3 | IJ9 | 49 | 39 | 20 | sufficient |
| E53 | SP3 | R3 | IJ10 | 49 | 38 | 22 | sufficient |
| E54 | SP3 | R3 | IJ11 | 49 | 36 | 27 | sufficient |
| E55 | SP3 | R3 | IJ12 | 49 | 37 | 24 | good |
| E56 | SP3 | R3 | IJ13 | 49 | 37 | 24 | good |
| E57 | SP3 | R3 | IJ14 | 49 | 33 | 33 | sufficient |
| E58 | SP3 | R3 | IJ15 | 49 | 40 | 18 | good |

As shown in Table 6B, the method described herein, wherein the UV-Vis radiation hybrid curable screen printing inks described herein is used, the viscosity of said UV-Vis radiation curable screen printing ink is between about 100 and about 2000 mPas at 25° C. (as measured with the method described herein), the inkjet ink deposit is as least about 5 g/$m^2$, preferably at least about 6 g/$m^2$ and more preferably at least about 9 g/$m^2$ (as measured with the method described herein), the viscosity of the top coating composition is less than about 30 mPas at 1000 $s^{-1}$ and 25° C. and the time between steps b) and c) is smaller than about 30 seconds, preferably smaller than 10 seconds, preferably smaller than about 3 seconds, more preferably smaller than about 1 second, allows the production of security features exhibiting one or more indicia and exhibiting sufficient contrast for security applications by using top coating compositions selected from the group consisting of cationically curable top coating compositions (IJ1-IJ5, wherein the top coating composition comprises one or more glycidyl ethers, one or more vinyl ethers, one or more cycloaliphatic epoxides or mixtures thereof), hybrid curable top coating compositions (IJ6, wherein the top coating composition comprises one or more hydroxy modified or (meth)acrylate modified vinyl ethers), solvent-based top coating compositions (IJ12-15, wherein the top coating composition comprises one or more alcohols (in particular ethanol), ethers (in particular dipropylene glycol methyl ether), ether-esters (in particular ethyl 3-ethoxypropionate), alkylene carbonates (in particular propylene carbonate)) and radically curable top coating compositions (IJ7-IJ11, wherein the top coating composition comprises one or more (meth)acrylate compounds (in particular monoacrylates, diacrylates or mixtures thereof with triacrylates and/or tetraacrylates).

D4. Variation of the Surface-Treated Pigment Flakes (E59-E63)

TABLE 7A

Results of security features made with UV-Vis radiation cationically curable screen printing ink and top coating inkjet ink (E59)

| | Screen printing ink | Reference | Inkjet ink | C* (45°/45°) first area | C* (45°/45°) second area | Contrast [%] | Visual assessment |
|---|---|---|---|---|---|---|---|
| E59 | SP2 | R2 | IJ2 | 48 | 34 | 29 | sufficient |

TABLE 7B

Results of security features made with UV-Vis radiation hybrid curable screen printing inks and top coating inkjet inks (E60-E63)

| | Screen printing ink | Reference | Inkjet ink | C* (45°/45°) first area | C* (45°/45°) second area | Contrast [%] | Visual assessment |
|---|---|---|---|---|---|---|---|
| E60 | SP4 | R4 | IJ2 | 42 | 19 | 55 | good |
| E61 | SP4 | R4 | IJ6 | 42 | 38 | 10 | good |
| E62 | SP4 | R4 | IJ13 | 42 | 35 | 17 | excellent |
| E63 | SP4 | R4 | IJ11 | 42 | 36 | 14 | good |

As shown in the previous Tables and in Tables 7A-B, the method described herein, wherein the UV-Vis radiation cationically or hybrid curable screen printing inks described herein is used, the viscosity of said UV-Vis radiation curable screen printing ink is between about 100 and about 2000 mPas at 25° C. (as measured with the method described herein), the inkjet ink deposit is as least about 5 $g/m^2$, preferably at least about 6 $g/m^2$ and more preferably at least about 9 $g/m^2$ (as measured with the method described herein), the viscosity of the top coating composition is less than about 30 mPas at 1000 $s^{-1}$ and 25° C. and the time between steps b) and c) is smaller than about 30 seconds, preferably smaller than 10 seconds, preferably smaller than about 3 seconds, more preferably smaller than about 1 second, allows the production of security features exhibiting one or more indicia and exhibiting sufficient contrast for security applications wherein the surface treated pigments comprise a flake-shaped non-metallic substrate (P1) or a multilayer substrate (P2).

D5. Variation of the Substrate (E64-E66)

TABLE 8

Results of security features made with a UV-Vis radiation hybrid curable screen printing inks and a top coating inkjet ink on different substrates (E64-E66)

| | Screen printing ink | Reference | Inkjet ink | Substrates | C* (45°/45°) first area | C* (45°/45°) second area | Contrast [%] | Visual assessment |
|---|---|---|---|---|---|---|---|---|
| E64 | SP4 | R4 | IJ5 | Fiduciary Cotton substrate (Louisenthal BNP) | 49 | 23 | 53 | excellent |

TABLE 8-continued

Results of security features made with a UV-Vis radiation hybrid curable screen printing inks and a top coating inkjet ink on different substrates (E64-E66)

| | Screen printing ink | Reference | Inkjet ink | Substrates | C* (45°/45°) first area | C* (45°/45°) second area | Contrast [%] | Visual assessment |
|---|---|---|---|---|---|---|---|---|
| E65 | SP4 | R4 | IJ5 | Primer fiduciary coated cotton substrate* | 49 | 22 | 55 | excellent |
| E66 | SP4 | R4 | IJ5 | Transparent window of polymer (Guardian by CCL Secure) | 49 | 22 | 55 | excellent |

*fiduciary cotton substrate (Louisenthal BNP) being coated with a UV-Vis radiation hybrid curable primer composition to smoothen the substrate surface, reduce the amount of screen printing ink abdorbed by the substrate and improve the optical properties of the security feature, said UV-Vis radiation hybrid curable primer composition comprising the ingredients provided in Table 9 and being applied by hand screen printing using a T90 (230 mesh) screen and cured by UV-radiation (two lamps: iron-doped mercury lamp 200 W/cm2 + mercury lamp 200 W/cm2 from IST Metz GmbH; 2 passes at 100 m/min). so as to produce a primer with a thickness of about 20 μm.

TABLE 9

UV-Vis radiation hybrid curable primer composition

| Primer composition Ingredients | wt % |
|---|---|
| UviCure S105ES 7-oxabicyclo[4.1.0]hept-3-ylmethyl 7-oxabicyclo[4.1.0]heptane-3-carboxylate (Lambson) [CAS No 2386-87-0] | 46.05 |
| VINNOL ® H14/36 (Wacker Polymer Systems Gmbh & Co. KG) (CAS No not available) | 6.2 |
| Diethylene glycol divinyl ether (BASF) [CAS No 764-99-8] | 18.8 |
| EBECRYL ® 2959 (epoxy acrylate oligomer) (Allnex) (CAS No not available) | 3.8 |
| MIRAMER M4004 pentaerythritol $(EO)_n$ tetraacrylate (Rahn) [CAS No 51728-26-8] | 3.8 |
| TEGO ® Airex 900 anti-foaming agent (Evonik) [CAS No 67762-90-7] | 0.2 |
| GENORAD* 16 polymerization inhibitor (Rahn) (CAS No not available) | 0.5 |
| AEROSIL ® R972 fumed silica post-treated with dimethyldichlorosilane (Evonik) [CAS No 68 911-44-9] | 1.9 |
| ACEMATT ® OK 607 high performance silica (Evonik) [CAS No 11 2926-008-8] | 5.4 |
| SilForce* UV9388C bis(4-tert-butylphenyl)iodonium hexafluorophosphate (Momentive) [CAS No 61358-25-6] | 1.7 |
| Omnirad 1173 -hydroxy-2-methylpropiophenone (IGM) [CAS No 7473-98-5] | 2.3 |
| SpeedCure CPTX 1-Chloro-4-propoxythioxanthone (Lambson) [CAS No 142770-42-1] | 0.15 |
| Ethyl 3-ethoxypropionate [CAS No 763-69-9] | 1.6 |
| Terathane 1000 (Invista) [CAS No 25190-06-1] | 5.7 |
| Butanol [CAS No 71-36-3] | 1.9 |
| Viscosity/Pas | 0.4 |

As shown in Table 8, the different substrates onto which the UV-Vis radiation hybrid curable screen printing ink and the top coating inkjet ink are applied to produce security features by the process according to the present invention do not have a significant impact on the contrast as measured by the goniospectrometer. Visually, the security features of examples E65-66 appear smoother and the contrast is easier to observe.

A further example has been prepared and is shown in FIG. 5A-C (pictures of security feature observed under diffuse illumination at angles 70° (FIG. 5A), 45° (FIG. 5B) and 22.5° (FIG. 5C), wherein said security feature has been prepared by applying the UV-Vis radiation hybrid curable screen printing ink SP1 hand on a piece of substrate (polymer BOPP Guardian® by CCL Secure, dimension: 70 mm×90 mm)) (520) using a 90T (230 mesh) screen so as at obtain a screen printed layer (510) having a thickness of about 20 μm and forming a square with the following dimensions: 50 mm×50 mm, by applying on top of the screen printed layer (510) the top coating inkjet ink IJ5 by a DOD (drop-on-demand) inkjet printing process using a KM1024i inkjet head (Konica Minolta, ink deposit: 9.4 $g/m^2$) on the screen printed layer (510) so as to obtain an indicium (530) having the shape of the name "SICPA" (size: 37.5 mm×10 mm). Subsequently to said inkjet step, the screen printed layer (510) and the inkjet printed indicia (530) were cured by exposure to a UV-LED lamp from Phoseon (Type FireLine 125×20 mm, 395 nm, 8 $W/cm^2$) for about 0.5 second, while the time between the inkjet printing step and the curing step was fixed at 0.5 seconds. As shown in FIG. 5, the contrast of the security feature made with the process according to the invention is barely visible observed with the naked eye at 70°, strongly increases at 45° and can be observed at 22.5°, thus making said security feature obtained with the process according to the invention excellent for security applications.

The invention claimed is:

1. A method for producing a security feature exhibiting one or more indicia on a substrate comprising:

a step a) of applying on a substrate surface a UV-Vis radiation curable coating composition, said UV-Vis radiation curable coating composition being in a first, liquid state so as to form a coating layer, said UV-Vis radiation curable coating composition comprising:

i) from about 75 wt-% to about 99 wt-% of an ink vehicle having a viscosity between about 100 and about 2000 mPas at 25° C. and comprising:

a) a1) from about 45 wt-% to about 75 wt-% of one or more cycloaliphatic epoxides and a2) from about 2 wt-% to about 15 wt-% of one or more cationic photoinitiators being onium salts, or b) b1) from about 45 wt-% to about 75 wt-% of a mixture comprising one or more cycloaliphatic epoxides and one or more radically curable compounds selected from the group consisting of tri(meth)acrylates, tetra(meth)acrylates and mixtures thereof and b2) from about 2 wt-% to about 15 wt-% of a mixture of one or more cationic photoinitiators being onium salts, and one or more free radical photoinitiators, c) the weight percents of a) and b) being based on the total weight of the ink vehicle; and ii) from about 1 wt-% to about 25 wt-% of pigments comprising a flake-shaped non-metallic or metallic substrate, wherein said non-metallic or metallic substrate comprises one or more at least partial coating layers independently made of one or more metal oxides, one or more metal oxide hydrates, one or more metal suboxides or mixtures of these materials and comprises an at least partial surface treatment layer facing the environment, being in direct contact with the top layer of the one or more at least partial coating layers and made of one or more surface modifiers selected from perfluoropolyethers, said perfluoropolyethers being functionalized with one or more phosphor containing groups or one or more silicon containing groups, the weight percent of i) and ii) being based on the total weight of the UV-Vis radiation curable coating composition;

subsequently to the step a), a step b) of applying by a contactless fluid microdispensing technology a top coating composition at least partially on top of the coating layer, wherein said top coating composition is applied in the form of one or more indicia, wherein said one or more indicia have an ink deposit of at least 5 $g/m^2$;

subsequently to step b), a step c) of curing the coating layer and the one or more indicia with one or more curing units, wherein the time between steps b) and c) is less than 30 seconds.

2. The method according to claim 1, wherein the ink vehicle further comprises c) one or more vinyl ethers in an amount less than about 20 wt-%, or one or more oxetanes in an amount less than or equal to about 30 wt-% or a combination of one or more vinyl ethers and one or more oxetanes, wherein said combination is present in an amount less than or equal to about 15 wt-%, the weight percents of a), b) and c) being based on the total weight of the ink vehicle.

3. The method according to claim 1, wherein the ink vehicle further comprises one or more polyhydroxy compounds comprising more than two hydroxyl groups, wherein said one or more polyhydroxy compounds are present in an amount less than or equal to about 25 wt-%, the weight percents being based on the total weight of the ink vehicle.

4. The method according to claim 1, wherein the ink vehicle further comprises one or more photosensitizers comprising thioxanthone derivatives, wherein said one or more photosensitizers are present in an amount about 0.1 wt-% to about 10 wt-%, the weight percents being based on the total weight of the ink vehicle.

5. The method according to claim 1, wherein the ink vehicle comprises from 45 to about 75 wt-% of a mixture comprising one or more cycloaliphatic epoxides and one or more radically curable compounds selected from the group consisting of tri(meth)acrylates, tetra(meth)acrylates and mixtures thereof, wherein said one or more radically curable compounds are present in an amount less than or equal to 35 wt-%, the weight percents being based on the total weight of the ink vehicle.

6. The method according to claim 5, wherein the top coating composition comprises one or more cationically curable compounds, one or more hybrid curable compounds, one or more solvents, one or more radically curable compounds or a mixture thereof.

7. The method according to claim 1, wherein the ink vehicle comprises the one or more cycloaliphatic epoxides comprising more than one cyclohexane epoxide groups, the one or more vinyl ethers, the one or more oxetanes, the one or more polyhydroxy compounds comprising more than two hydroxyl groups and the one or more cationic photoinitiators being onium salts selected from the group consisting of oxonium salts, iodonium salts, sulfonium salts and mixtures thereof.

8. The method according to claim 7, wherein the top coating composition comprises one or more cationically curable compounds, one or more hybrid curable compounds, one or more solvents, a blend of one or more radically curable compounds and one or more radical photoinitiators or a mixture thereof.

9. The method according to claim 1, wherein the ink vehicle comprises the one or more cycloaliphatic epoxides comprising more than one cyclohexane epoxide groups, the one or more vinyl ethers, the one or more oxetanes, the one or more polyhydroxy compounds comprising more than two hydroxyl groups, the one or more cationic photoinitiators being onium salts, selected from the group consisting selected from the group consisting of oxonium salts, iodonium salts, sulfonium salts and mixtures thereof, the one or more radically curable compounds selected from the group consisting of tri(meth)acrylates, tetra(meth)acrylates and mixtures thereof, the one or more the one or more free radical photoinitiators.

10. The method according to claim 1, wherein the pigments comprise a flake-shaped metallic substrate consisting of a multilayer comprising one or more metallic layers, wherein said pigments comprise one or more at least partial coatings independently made of one or more metal oxides or wherein the pigments comprise a flake-shaped non-metallic substrate which is made of one or more materials selected from the group consisting of natural micas, synthetic micas and glasses.

11. The method according to claim 1, wherein the perfluoropolyethers are functionalized with one or more phosphate containing groups or one or more silane containing groups.

12. The method according to claim 1, wherein the step c) of curing the coating layer and the one or more indicia is carried out with one or more curing units selected from the group consisting of mercury lamps, UV-LED lamps and sequences thereof.

13. The method according to claim 1, wherein the one or more indicia are selected from the group consisting of codes, symbols, alphanumeric symbols, motifs, geometric patterns, letters, words, numbers, logos, drawings, portraits and combinations thereof.

14. The method according to claim 1, wherein the step a) is carried out by a process selected from the group consisting of rotogravure processes, flexography processes and screen printing processes selected from the group consisting of screen printing processes and/or the step b) is carried out by an inkjet printing process.

15. A security feature produced by the method recited in claim 1.

16. The method according to claim 1, wherein the one or more cationic photoinitiators in component a) are selected from the group consisting of oxonium salts, iodonium salts, sulfonium salts and mixtures thereof; and wherein the one or more radically curable compounds in component b) are selected from the group consisting of tri(meth)acrylates, tetra(meth)acrylates and mixtures thereof; and wherein the mixture of one or more cationic photoinitiators being onium salts in component b) are selected from the group consisting of oxonium salts, iodonium salts, sulfonium salts and mixtures thereof; and wherein the one or more free radical photoinitiators in component b) are selected from the group consisting of alpha-hydroxyketones, benzyl ketals, benzoin ethers, phosphine oxides, phenylglyoxylates and mixtures thereof.

17. The method according to claim 5, wherein said one or more radically curable compounds are present in an amount less than or equal to 30 wt-%.

18. The method according to claim 7, wherein the ink vehicle further comprises one or more photosensitizers comprising thioxanthone derivatives and one or more fillers.

19. The method according to claim 9, wherein the one or more cycloaliphatic epoxides further comprises one or more photosensitizers comprising thioxanthone derivatives and one or more fillers.

20. The method according to claim 10, wherein the pigments comprise thin film interference multilayers having a Fabry-Perot absorber/dielectric/reflector/dielectric/absorber structure.

* * * * *